March 5, 1968
R. H. PEARSON
3,371,739
MEANS FOR VARIABLY CONTROLLING THE BUOYANCY OF
A SEISMIC DETECTION STREAMER
Filed May 23, 1966
14 Sheets-Sheet 1
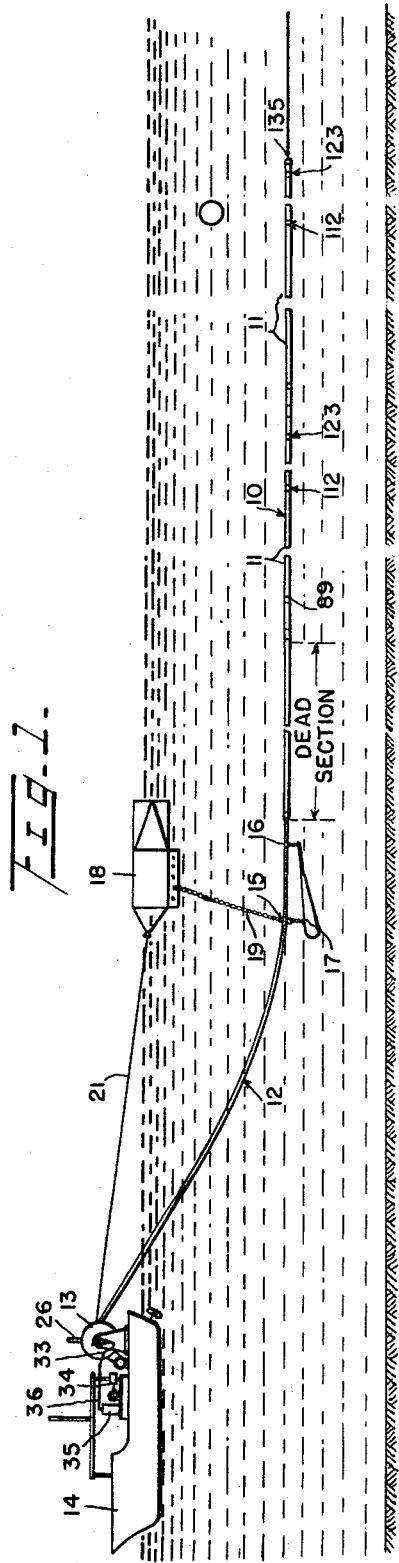
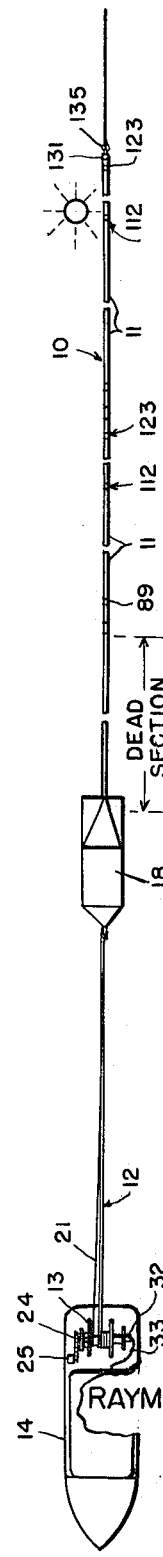
INVENTOR
RAYMOND H. PEARSON
BY
R. M. Hicks
ATTORNEY

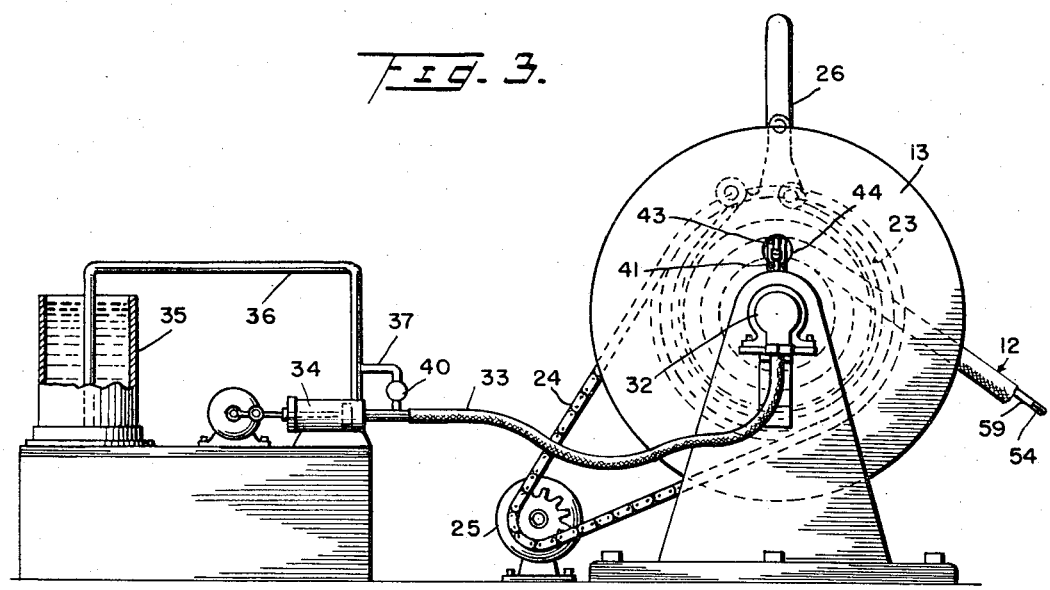
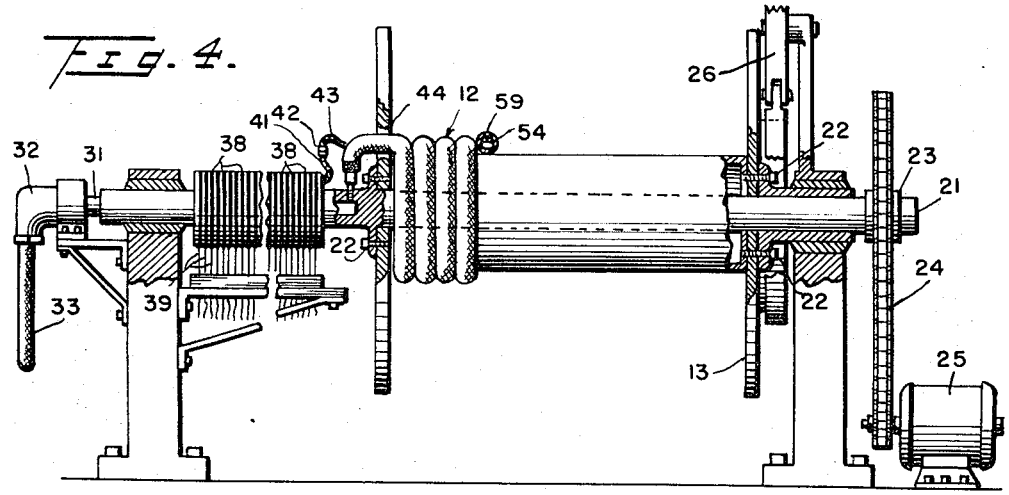
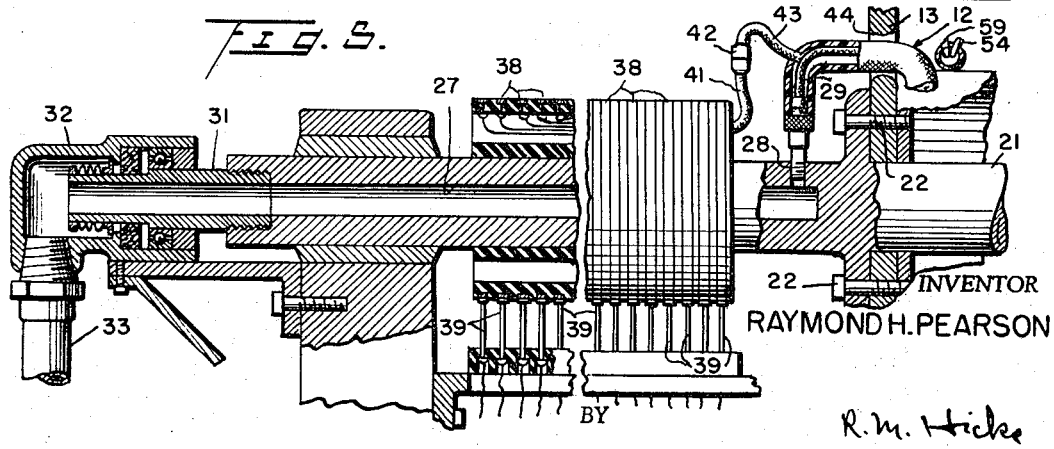

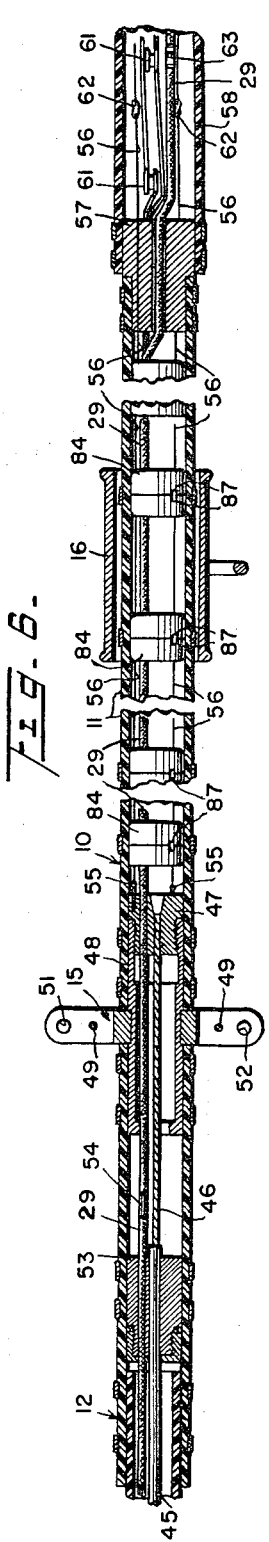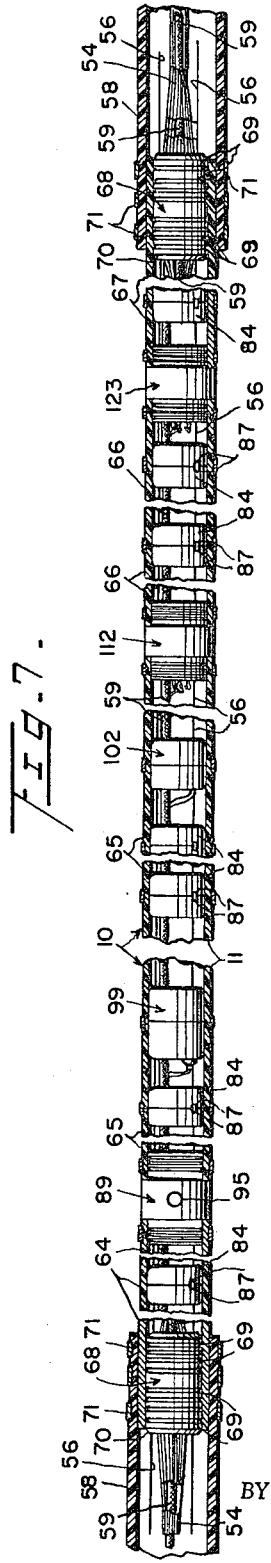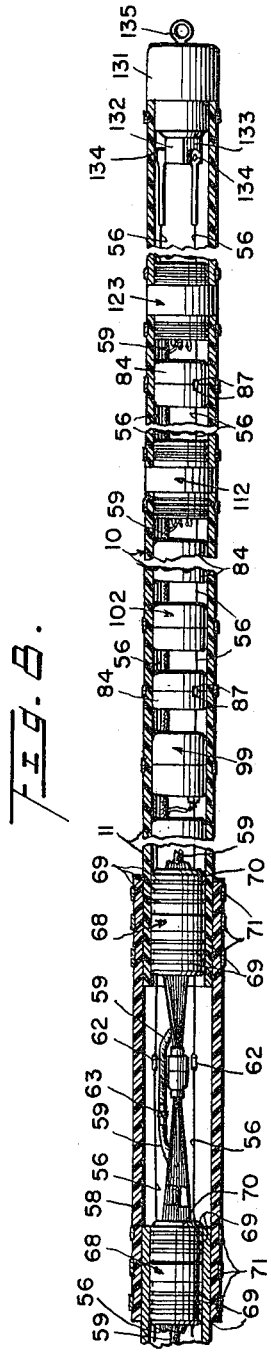

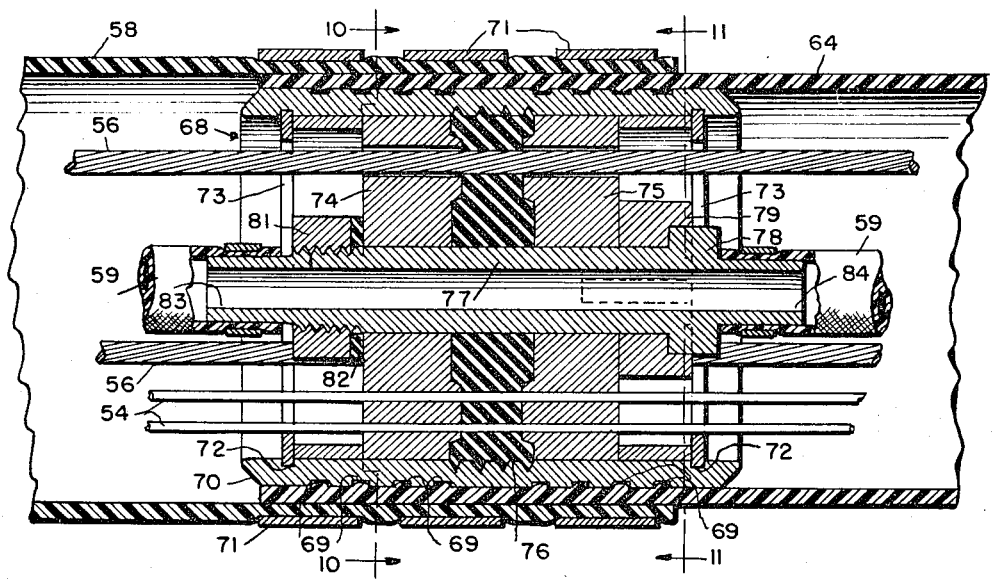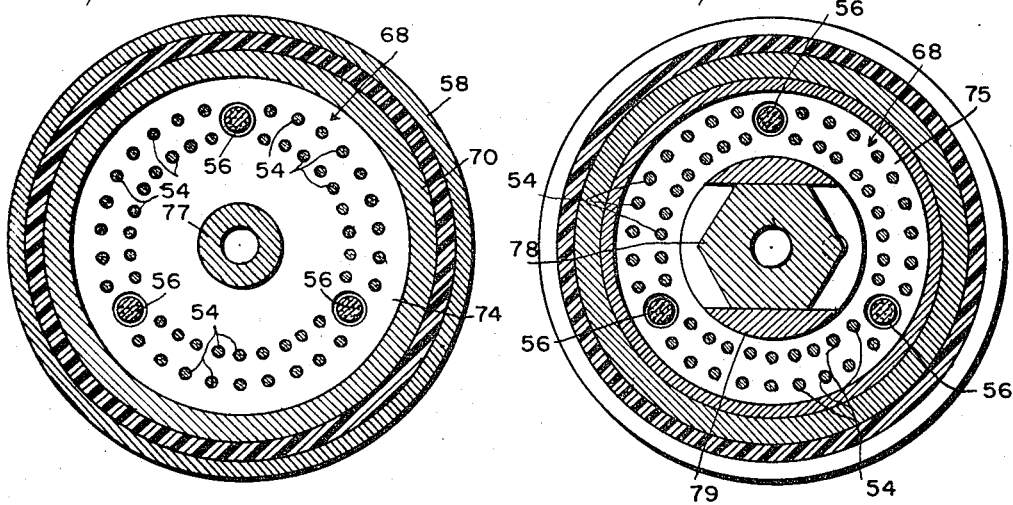

March 5, 1968 R. H. PEARSON 3,371,739
MEANS FOR VARIABLY CONTROLLING THE BUOYANCY OF
A SEISMIC DETECTION STREAMER
Filed May 23, 1966 14 Sheets-Sheet 5
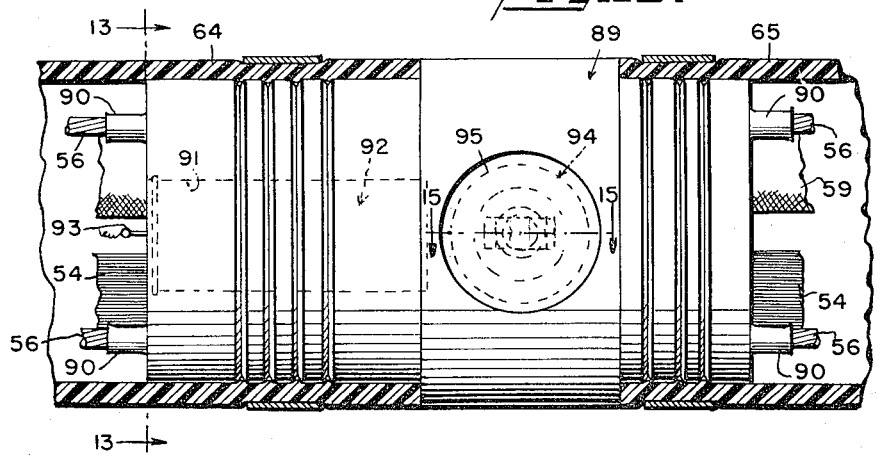
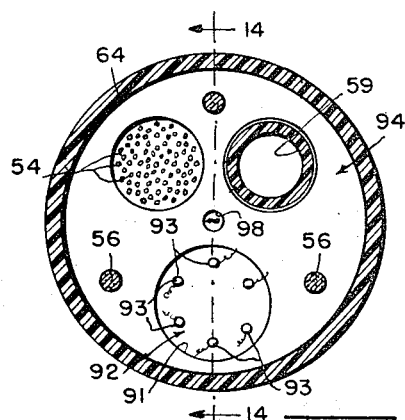
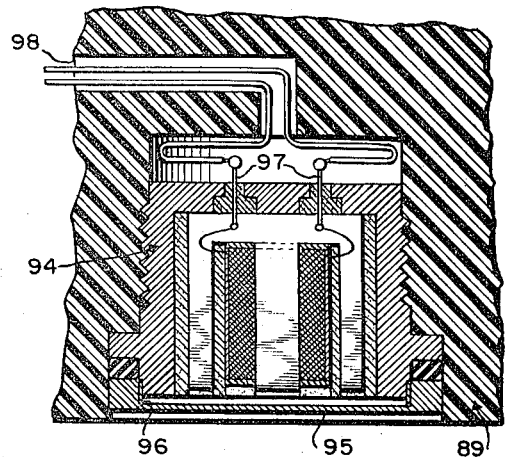
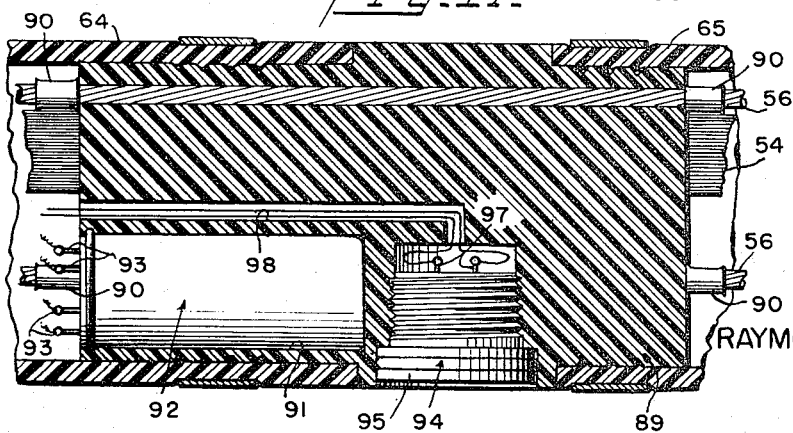
INVENTOR
RAYMOND H. PEARSON
BY
R. M. Hicks
ATTORNEY

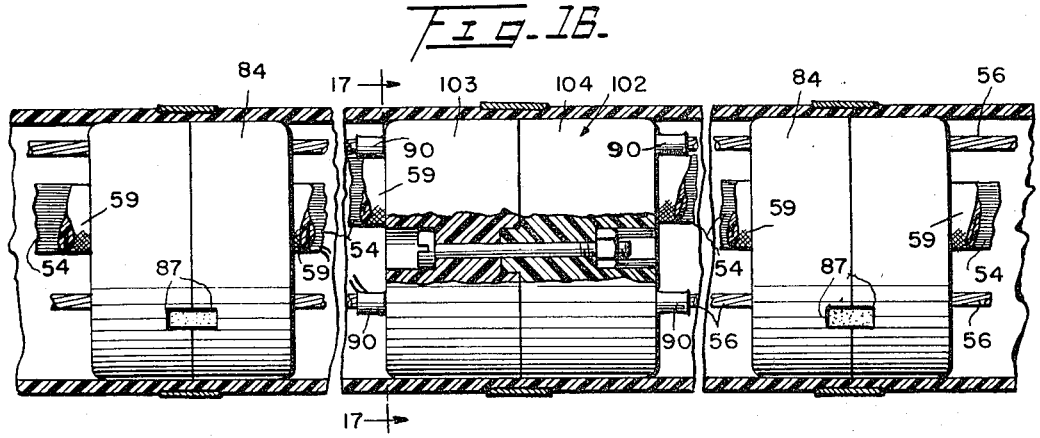
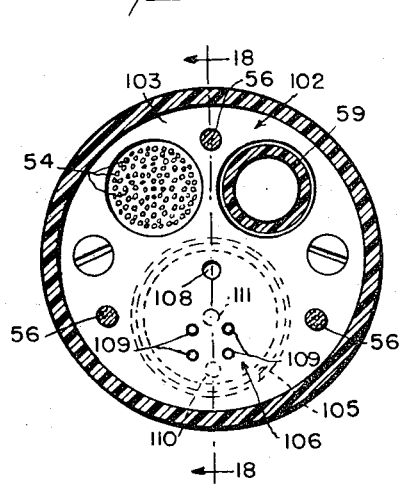
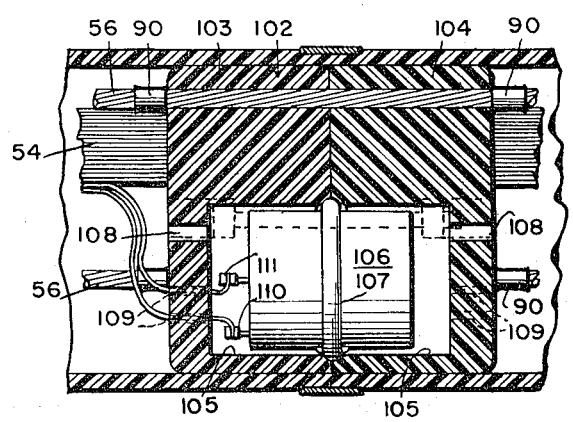
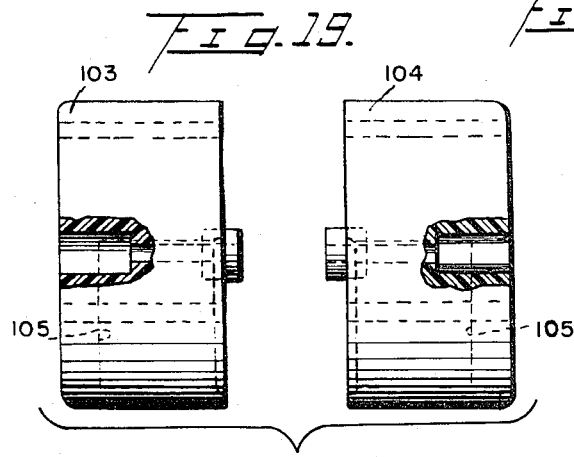
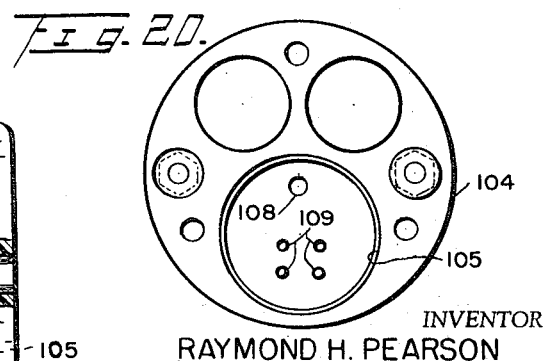
INVENTOR
RAYMOND H. PEARSON
BY R. M. Hicks
ATTORNEY

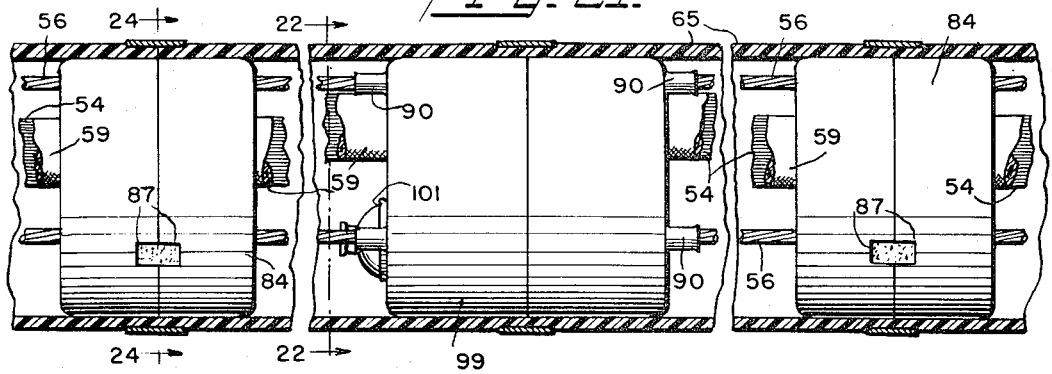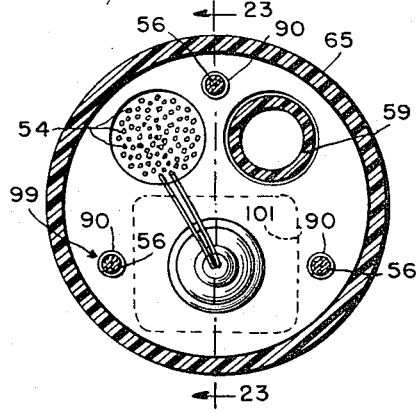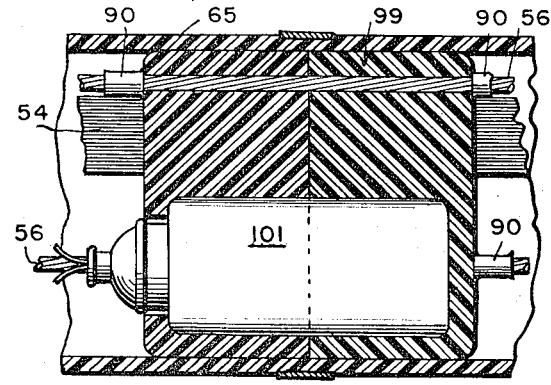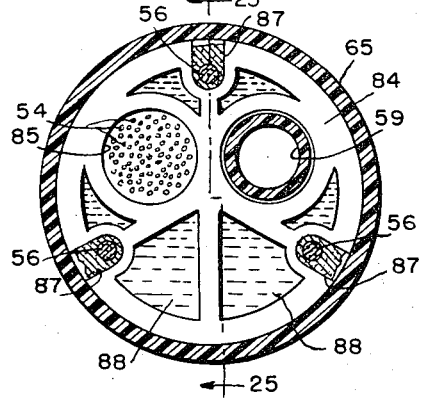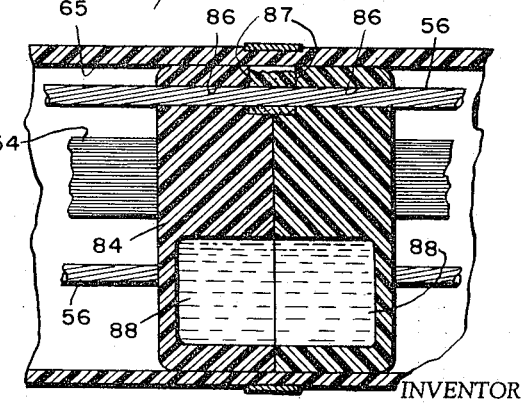

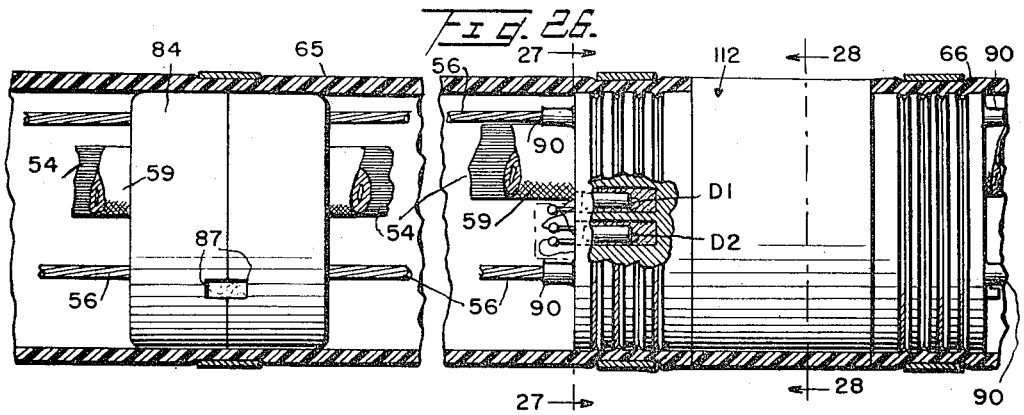
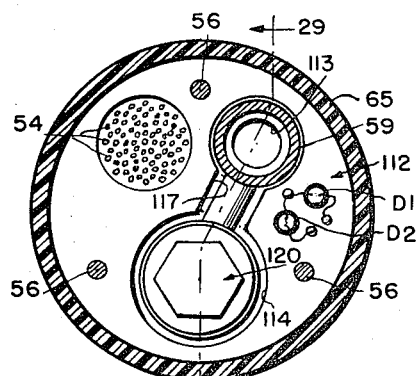
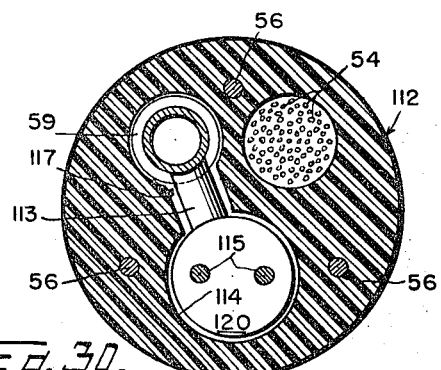
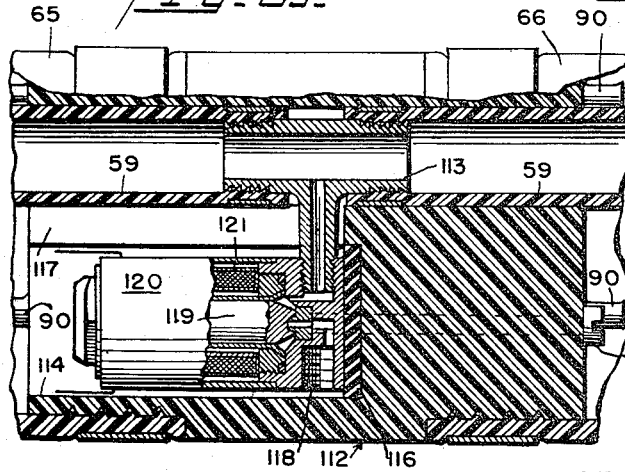
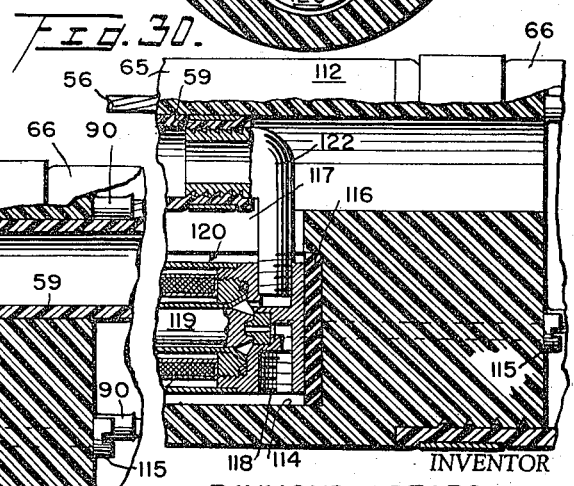
INVENTOR
RAYMOND H. PEARSON
BY R. M. Hicks
ATTORNEY

INVENTOR
RAYMOND H. PEARSON

BY R. M. Hicks
ATTORNEY

March 5, 1968  R. H. PEARSON  3,371,739
MEANS FOR VARIABLY CONTROLLING THE BUOYANCY OF
A SEISMIC DETECTION STREAMER
Filed May 23, 1966  14 Sheets-Sheet 10
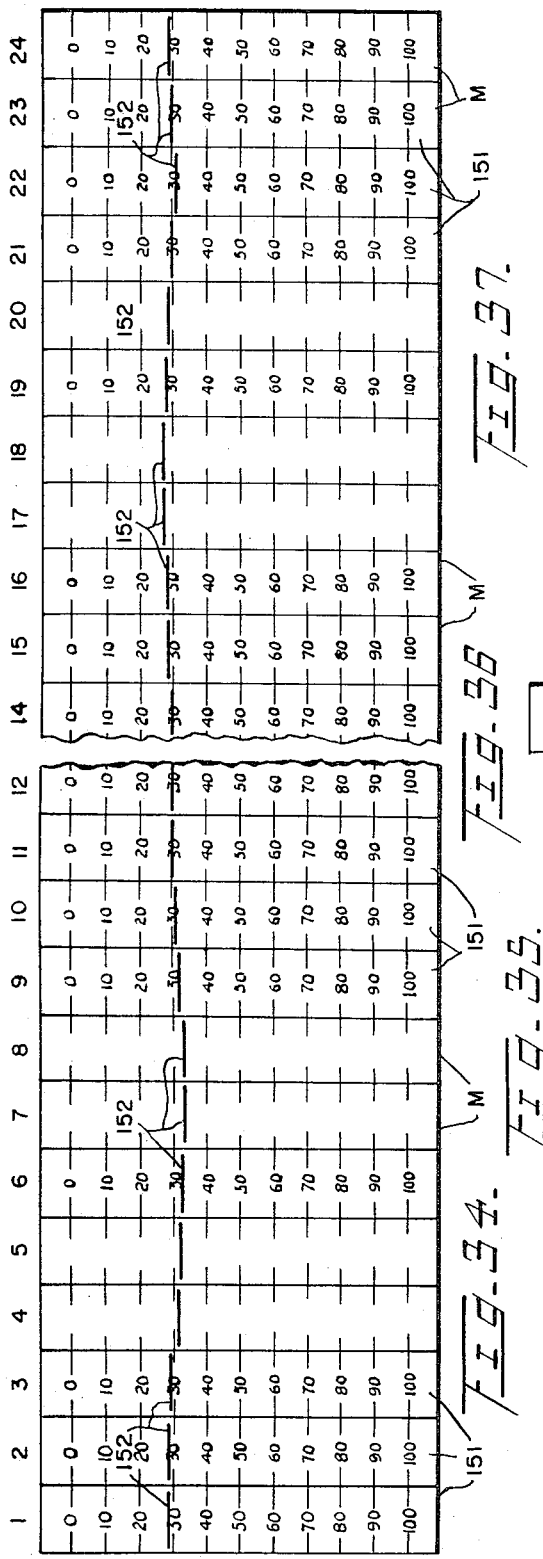
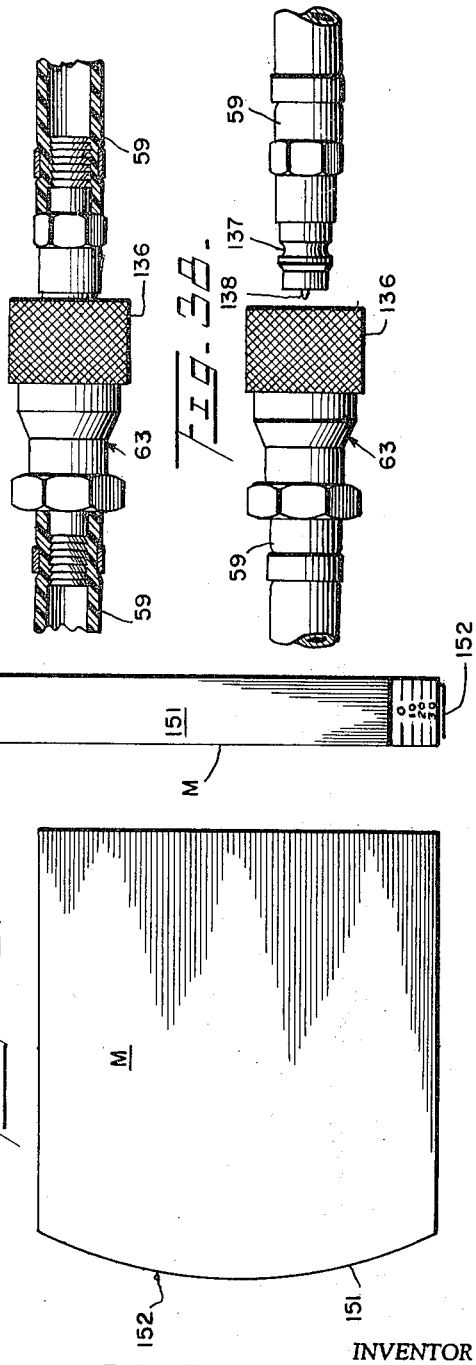
INVENTOR
RAYMOND H. PEARSON
BY  *R. M. Hicks*
ATTORNEY

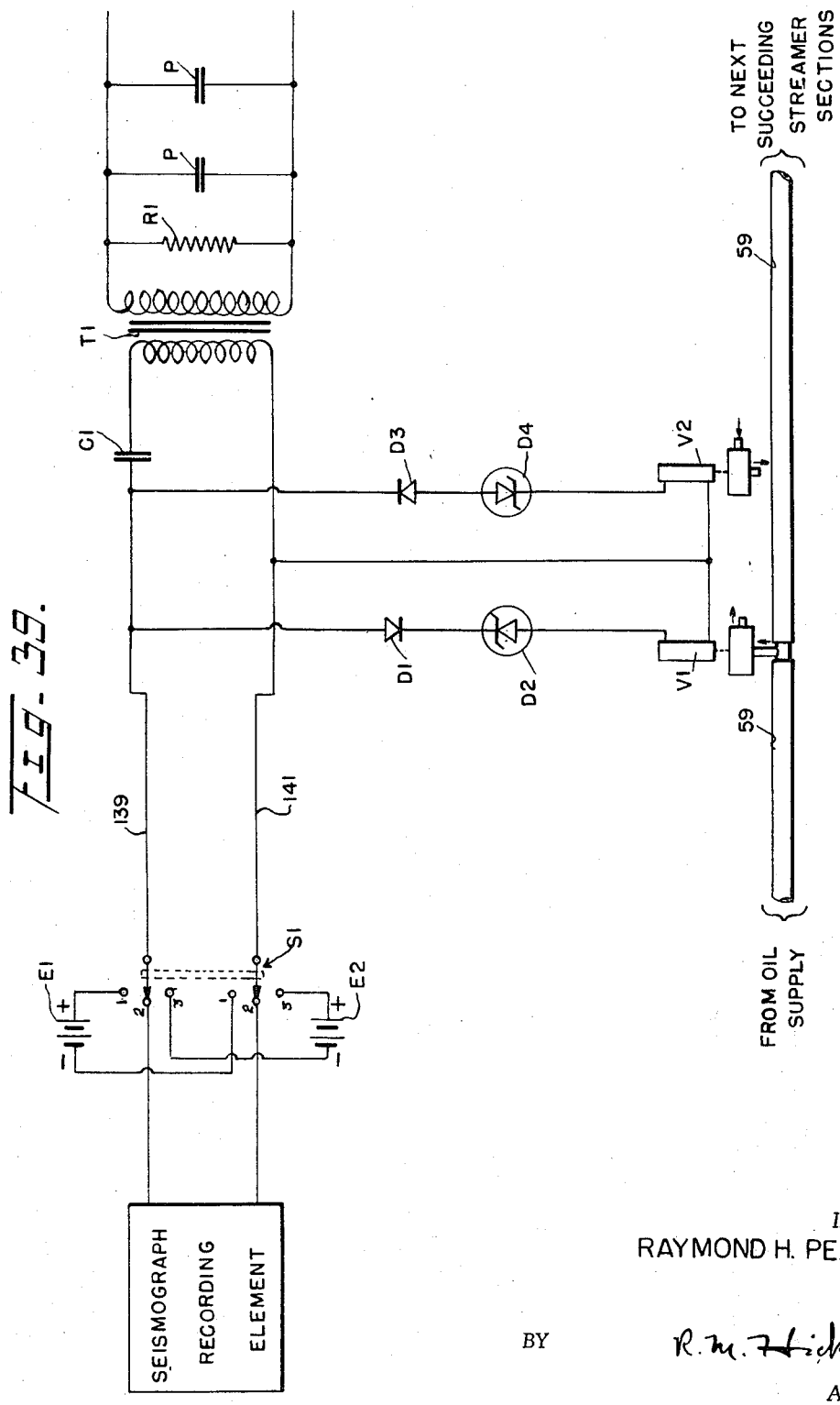

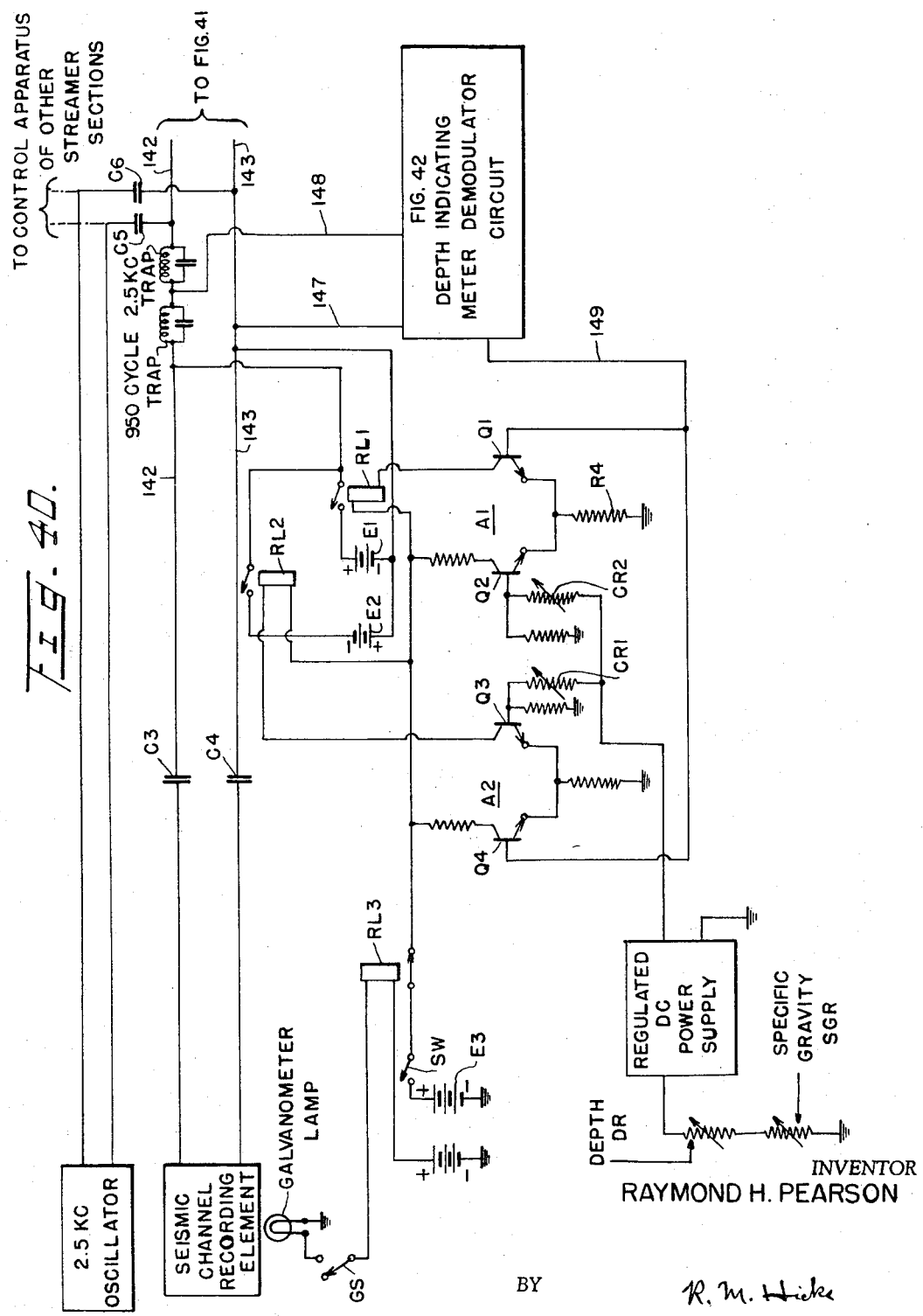

INVENTOR
RAYMOND H. PEARSON

R. M. Hicke
ATTORNEY

United States Patent Office 3,371,739
Patented Mar. 5, 1968

3,371,739
MEANS FOR VARIABLY CONTROLLING THE BUOYANCY OF A SEISMIC DETECTION STREAMER
Raymond H. Pearson, Richardson, Tex., assignor to Whitehall Electronics Corporation of the First Bank & Trust Building, Richardson, Tex.
Filed May 23, 1966, Ser. No. 552,098
22 Claims. (Cl. 181—.5)

ABSTRACT OF THE DISCLOSURE

A buoyancy control system for an expansible detection streamer comprising a plurality of serially connected oil filled sections, each containing a plurality of wave detectors therein for transmitting electrical seismic signals over a two conductor channel to a vessel while the streamer is towed thereby, each section having an oil line including a normally closed electrically operated inlet valve connected to a pressurized oil source on the vessel, a second normally closed electrically operated valve operable to exhaust oil from the section, a depth actuated transducer within each section connected by the channel to control apparatus on the vessel and effective during a towing operation to operate the inlet and exhaust valves selectively to maintain each section at a constant fixed depth of submersion.

---

This invention relates to underwater apparatus for making a high fidelity survey of water covered areas and more particularly to a new and improved oil filled expansible streamer composed of serially connected sections immersed within the water for improving the character of the seismic signal reflected from subaqueous geological formations in response to an acoustical impulse within the water and picked up by a plurality of detecting devices disposed within the sections while the streamer is towed by a vessel along a predetermined course, the improvement in the seismic signal resulting from new and improved means disposed at intervals within the streamer sections for varying the specific gravity thereof sufficiently to maintain a predetermined degree of buoyancy uniformly throughout the length of the streamer while the streamer is towed by the vessel.

In prior systems of this character heretofore devised such, for example, as the system disclosed and claimed in application Ser. No. 480,868 for Depth Controlled Marine Seismic Detection Cable, filed Aug. 19, 1965, George M. Pavey, inventor, it has been the usual practice to maintain the submerged streamer at a predetermined depth of submersion by employing a plurality of stream lined floats and depressors connected at intervals throughout the length of the detection streamer. Such systems, while generally suitable for the purpose intended, possess the disadvantage of providing unwanted noise signals from the floats and depressors during the towing operation which would adversely affect the seismic detecting devices within the streamer unless noise attenuating devices were employed therebetween or the towing force was removed sufficiently to permit the depressor to sink to the bottom and anchor the streamer when seismic signals reflected from the subbottom were received.

The present invention possesses all of the advantages of the prior systems employing pressure type detectors disposed within an elongated flexible oil filled streamer towed in a submerged condition within the water and none of the foregoing disadvantages.

In accordance with the teaching of the present invention the streamer is provided with a copious supply of oil maintained therein under pressure sufficient to expand the streamer somewhat and thereby increase the buoyancy of the streamer. Hydrostatic devices within the streamer sections and in communication with the ambient water control an additional quantity of pressurized oil from the towing vessel to flow into the streamer sections and thereby increase the buoyancy thereof sufficiently for the streamer sections to move upwardly within the water, or to allow some of the oil within the streamer sections to exhaust into the surrounding water sufficiently to cause the streamer to sink within the water, as the case may be, until the streamer reaches a predetermined depth of submersion throughout the length thereof. This arrangement provides means for variably adjusting the buoyancy of the streamer sections sufficiently to maintain the streamer at a uniform depth of submersion throughout the length thereof while the streamer is being towed at a relatively high rate of speed.

According to an alternative form of the invention pressure sensing devices within the streamer are employed to send an electrical signal to the vessel correlative with the instant depths of the different streamer sections. These signals are made manifest to an operator on a plurality of signal devices on the vessel. The operator applies a signal control selectively to each of the streamer sections in accordance with the signals received therefrom which causes a variation in the quantity of oil stored within the streamer, either by the addition of oil thereto or exhaust of a portion of the stored oil into the sea, as the case may be, sufficiently to adjust the buoyancy of the different streamer sections to a predetermined value and cause the streamer to be maintained at a predetermined depth of submersion while the streamer is towed through the water by the vessel.

One of the objects of the present invention resides in the provision of means within an oil filled expansible detection streamer adapted to be towed submerged within a body of water for varying the quantity of oil within the streamer selectively to render the streamer neutrally buoyant at a predetermined depth of submersion.

Another object resides in the provision of new and improved circuit arrangements for providing a signal on the towing vessel correlative with the instant depths of submersion of the streamer throughout the length thereof and varying the buoyancy of the streamer selectively in accordance with the signal sufficiently to maintain the streamer at a predetermined depth of submersion throughout the length thereof.

Still another object is the provision of an expansible underwater detection streamer comprising a plurality of interconnected oil filled sections adapted to be towed in a submerged condition within a body of water and new and improved means for varying the buoyancy of each of said sections sufficiently to maintain the streamer at a uniform depth of submersion throughout the length thereof while the streamer is being towed through the water.

A further object resides in the provision of new and improved means for applying at will a depth control signal to each section of an expansible underwater detection streamer over the pair of conductors comprising a seismic channel between the seismic detecting devices within the streamer and a seismic recording device on the vessel, and for rendering the channel unresponsive to the depth control signal while seismic signals are received by the detecting devices.

A further object resides in the provision of an oil filled expansible streamer for detecting seismic disturbances reflected upwardly from oil bearing geological formations beneath the bed of a body of water within which the streamer is towed in a submerged condition, and new and improved means operable selectively in accordance with the depth of submersion of the streamer for increasing or creasing the quantity of oil within the streamer, as the case may be, sufficiently to maintain the streamer throughout the length thereof at a predetermined depth of submersion within the water.

Still other objects, advantages and improvements will become apparent from the following description, taken in connection with the accompanying drawings of which:

FIG. 1 is a diagrammatic view of the system of the present invention in accordance with a preferred embodiment thereof in which the detection streamer is being towed by a vessel at a predetermined depth of submersion throughout the length thereof;

FIG. 2 is a plan view of the system of FIG. 1 at the instant a seismic shot is fired;

FIG. 3 is a side view of the cable reel and oil supply apparatus on the vessel;

FIG. 4 is an end view partially in section and partially broken away of the reel of FIG. 3;

FIG. 5 is a greatly enlarged view partially broken away of the electrical and oil connections at an end portion of the shaft of the reel of FIG. 3;

FIG. 6 is a sectional view of the lead-in cable;

FIG. 7 is a sectional view of one of the detection streamer sections;

FIG. 8 is a sectional view of the trailing end section;

FIG. 9 is a greatly enlarged view in section of a packing box clamped in sealing engagement with an end portion of one of the streamer sections;

FIG. 10 is a view taken along line 10—10 of FIG. 9;

FIG. 11 is a view taken along line 11—11 of FIG. 9;

FIG. 12 is a view of the coupling member or depth indicator spacer having adjacent end portions of the pair of outer sleeve members comprising a streamer section clamped thereto with the oscillator and exhaust valve mechanism therein shown in dashed outline;

FIG. 13 is a view of the coupling member taken substantially along the line 13—13 of FIG. 12;

FIG. 14 is a view in section of the depth indicator and oscillator elements taken substantially on the line 14—14 of FIG. 13;

FIG. 15 is a greatly enlarged view in section of the depth indicator spacer of FIG. 14 taken along the line 15—15 of FIG. 12;

FIG. 16 is a view of one of the hydrophone mountings with a pair of spacer elements respectively disposed on opposite sides thereof;

FIG. 17 is a view of the hydrophone mounting taken substantially along the line 17—17 of FIG. 16;

FIG. 18 is a view of a hydrophone within the mounting taken along line 18—18 of FIG. 17;

FIG. 19 is a view of the hydrophone mounting spacer of FIG. 18 with the parts separated prior to the insertion of a hydrophone therein;

FIG. 20 is an end view of one of the hydrophone spacer elements and the clamping bolts therefor;

FIG. 21 is a view of one of the transformer mounting elements and a pair of spacers on opposite ends thereof;

FIG. 22 is a view taken along the line 22—22 of FIG. 21;

FIG. 23 is a view taken along line 23—23 of FIG. 22;

FIG. 24 is a view taken along line 24—24 of FIG. 21;

FIG. 25 is a view taken along line 25—25 of FIG. 24;

FIG. 26 is a view partially broken away of the inlet valve support and certain electrical components supported thereby, said support having a pair of lengths of outer sleeve covering securely clamped to opposite end portions thereof;

FIG. 27 is a view taken on line 27—27 of FIG. 26;

FIG. 28 is a view taken substantially on line 28—28 of FIG. 26;

FIG. 29 is a somewhat enlarged sectional view of the oil inlet valve and the oil connection thereto taken substantially on line 29—29 of FIG. 27;

FIG. 30 is a fragmentary view in section of the oil inlet valve employed with the last trailing section of the detection streamer;

FIG. 34 is a diagrammatic view of the depth indicating device on the vessel, having indicating means individual to each of 24 streamer sections;

FIG. 35 is a diagrammatic side elevational view of the multi-channel indicating device of FIG. 34;

FIG. 36 is a plan view of one of the depth indicating devices of FIG. 34;

FIG. 37 is a view of one of the quick oil connectors suitable for use with the system of the present invention;

FIG. 38 is a view of the quick oil connectors of FIG. 37 with the parts disconnected;

FIG. 39 is a schematic diagram of an arrangement suitable for use with the system of FIG. 1 in which the oil flow both into or out of the streamer is manually controlled at will by an operator on the towing vessel;

FIG. 40 is a schematic diagram of the apparatus on the vessel according to a preferred embodiment of the invention in which the intervention of an operator to control the buoyancy of the different streamer sections is not required;

Figure 41:
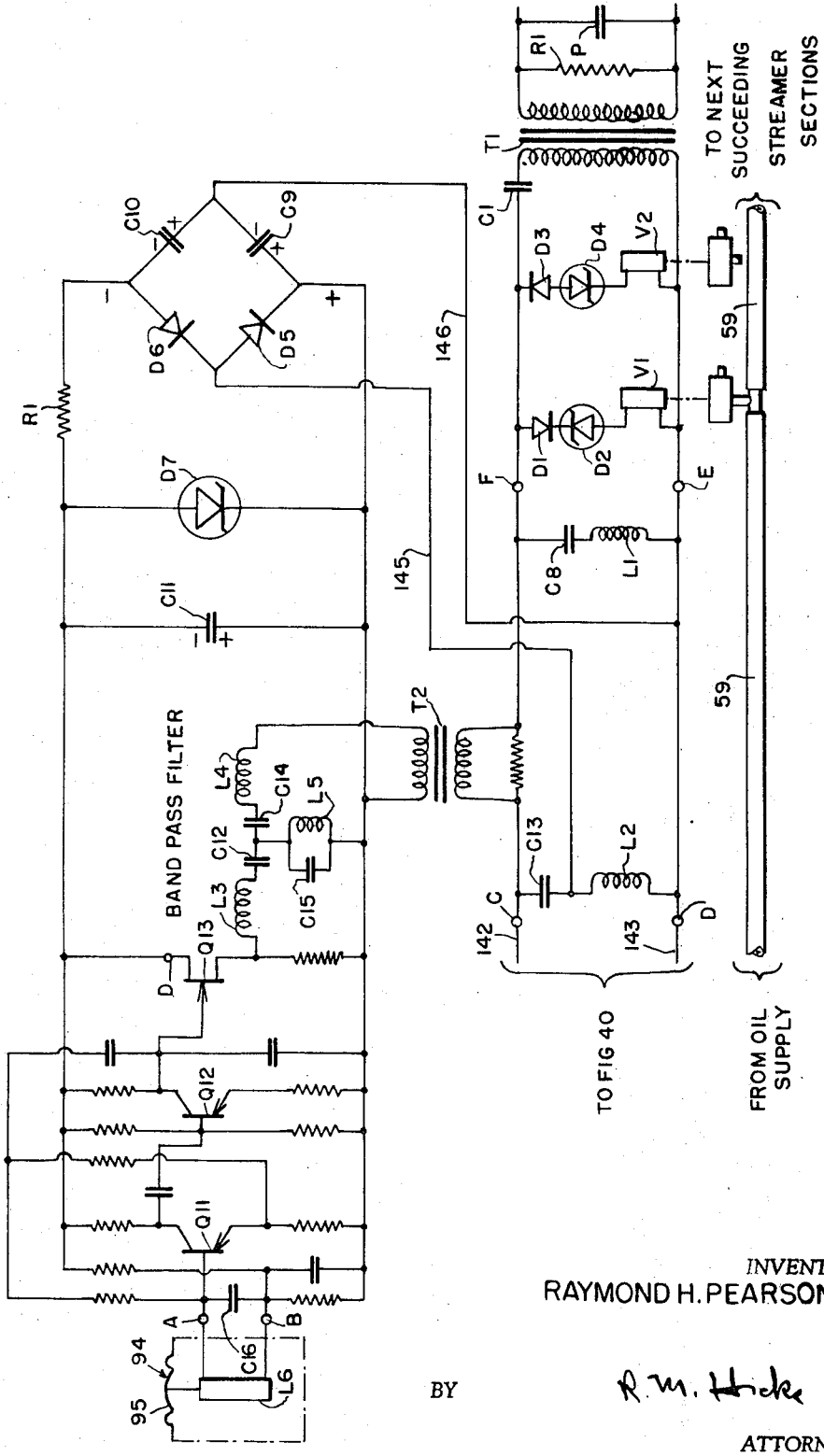
Figure 42:
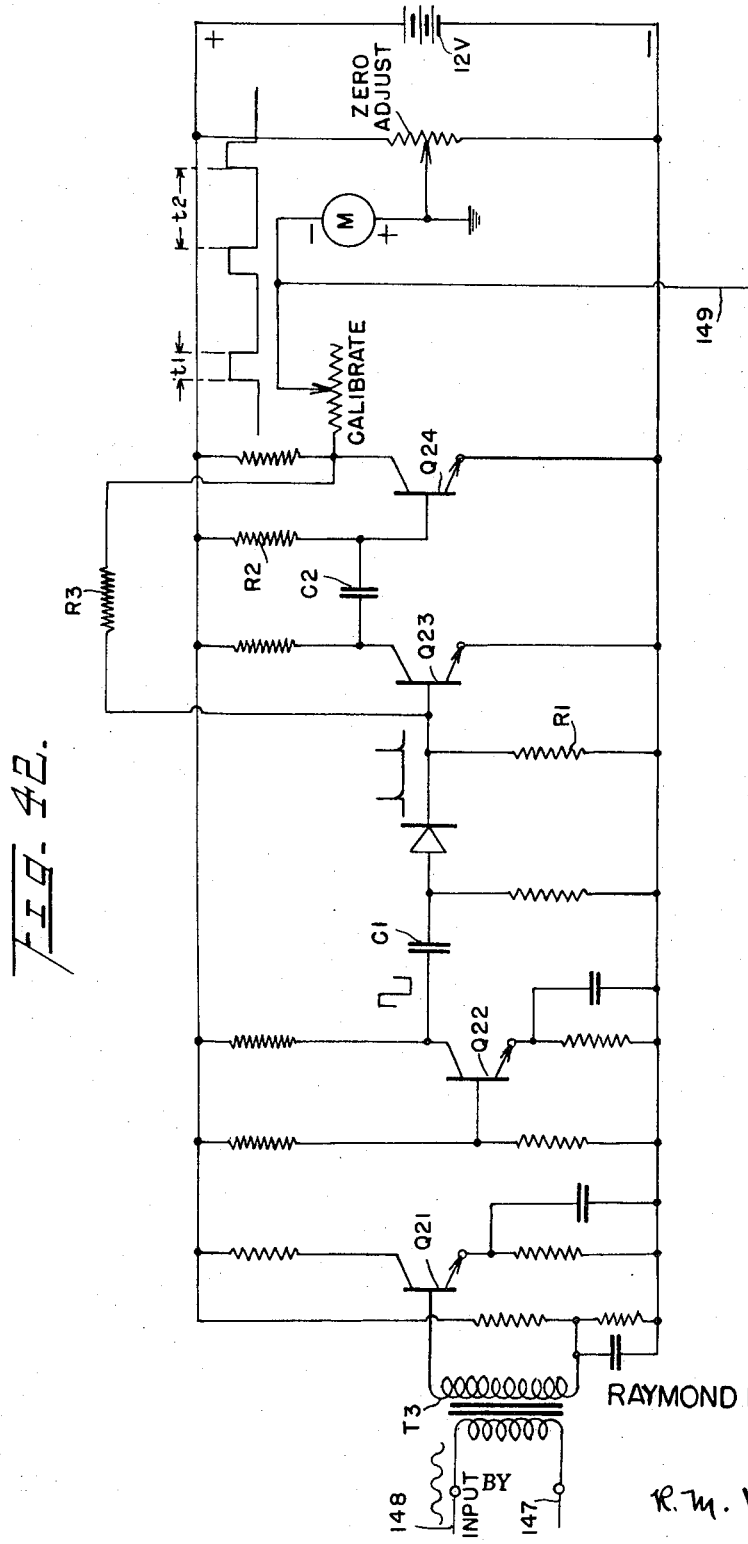

FIG. 41 is a schematic diagram of the apparatus within a streamer which when connected to the apparatus of FIG. 40 on the vessel provides a D.C. voltage control selectively applied to the input and output valves in accordance with the instant depth of submersion of the streamer section sensed by the transducer shown thereon; and FIG. 42 is a schematic view of the depth indicating meter demodulating circuit of FIG. 40.

Referring now to the drawings for a more complete understanding of the invention and more particularly to FIG. 1 thereof there is shown thereon in diagrammatic form a system in accordance with a preferred embodiment of the invention employing a flexible expansible detection streamer indicated generally by the numeral 10 comprising a plurality of serially connected sections 11 towed in a submerged condition within the water by a lead-in or tow cable 12 adapted to be payed out and withdrawn at will by a reel 13 carried by a vessel 14. Secured to the lead-in 12 as by clamp 15 and sleeve member 16 is a depressor 17 for maintaining the trailing end of the tow cable at a predetermined depth of submersion while the streamer is being towed by the vessel. A float member 18 is connected to the lead-in at 15 as by a chain 19 and towed by the vessel by means of line 21 at a distance therefrom such that the float is substantially above the depressor while the towing operation is in progress.

Preferably, but not necessarily, an elastic dead section streamer is connected between the trailing end of the lead-in and the head end of the detection streamer 10. The arrangement thus far described is generally similar to the seismic prospecting system disclosed and claimed in a co-pending application of George M. Pavey, Jr., for Elastic Detection Streamer Dead Section for a Waterborne Seismic Surveying System, Ser. No. 464,739, filed June 17, 1965, now Patent No. 3,319,734, issued May 16, 1967, in which means are provided for preventing vibrations from the tow cable from adversely affecting the signal detecting devices within the detection streamer while the streamer is being towed through the water. The lead-in and dead section streamer differ from those shown in the copending patent application supra, in the provision of a flexible oil tube or duct extending interiorly throughout the length thereof having a quantity of pressurized oil therein for forcing an additional quantity of oil into the streamer sections selectively for additionally expanding the streamer sections to increase the buoyancy thereof, as will more clearly appear as the description proceeds.

Referring now to FIGS. 3–5 of the drawings, the reel 13 is carried by a rotatable shaft 21 and secured thereto in any suitable manner as by the bolts 22 illustrated. There is also secured to the shaft 21 a driving sprocket 23 connected as by the chain 24 to an electric motor 25. A brake 26 is employed to stop and lock the reel, when desired. The opposite end of shaft 21 is provided with an axial bore 27 in communication with a threaded radial bore 28 within which is threaded an oil fitting for establishing an oil connection to flexible tube 29 within the tow cable 12. Bore 27 is threaded at the outer end thereof to receive a hollow rotary coupling member 31 having a fixed element 32 coacting therewith. Element 32 is provided with a nipple for engagement with a pressure type tube 33 to establish fluid connection with a motor driven oil pump 34 whereby oil is pumped thereto from an oil reservoir 35 by way of tubular member 36. A bypass 37 having a pressure release valve 40 included therein is provided to maintain a predetermined degree of pressure on the oil within the tube 33.

The shaft 21 is also provided with a plurality of slip rings 38 having a like number of fixed contact elements 39 in respective engagement therewith for establishing electrical connections to the seismograph elements and buoyancy control elements on board the vessel. The slip rings are connected by conductors within cable 41 terminating in a multi-contact plug and jack 42 to conductors within cable 43 disposed interiorly within the lead-in or tow cable 12, an end portion thereof extending outwardly through aperture 44 within the reel 13 substantially as shown.

Referring now to FIG. 6 there is shown thereon a sectional view of a lead-in or tow cable suitable for use with the present invention and generally indicated by the numeral 12, the lead-in enclosing a flexible tubular member 45 having a flexible strain cable 46 enclosed therein. The lower end of the strain cable 46 is secured to a spider 47 substantially as shown threadedly engaged within a sleeve member 48 to which the separable clamp 15 is secured as by a pair of bolts within apertures 49. Apertures 51 and 52 are provided for establishing connections with the float 18 and depressor 17 respectively. Sleeve 16, it will be noted, is provided with an eye member protruding downwardly therefrom for establishing a connection to a line connecting the trailing end of depressor 17 thereto. The spacer element 53 is clamped within the tow cable substantially as shown, FIG. 6, and provided with an axial bore for receiving the tubular member 45 surrounding strain cable 46 therein, and a pair of additional bores parallel thereto through which the oil tube 29 and conductors 54 respectively extend.

Spider 47 is provided with three uniformly spaced eyebolts 55 or the like to which are respectively secured three strain cables 56 extending rearwardly along the length of the detection streamer for applying a towing force thereto. The strain cables 56, oil tube 29, and conductors 54 extend rearwardly from the trailing end of the tow cable 12 and pass within a plug 57 encircled and clamped securely thereto by the lower end of the tow cable and on the other end by a short length of coupling hose 58 secured thereto.

Whereas, on FIGS. 1 and 2 there is shown a dead section length of streamer connected between the trailing end of the tow cable and the head end of the detection streamer, this is by way of example only and is not necessary in the use of the present invention. The dead section comprises three extensible strain cables running interiorly throughout the length thereof and respectively connected to the three metallic strain cables within the detection streamer to minimize fortuitous noise from the tow cable, depressor and float connections sufficient to prevent it from adversely affecting the seismic detecting devices within the detection cable, the dead section being generally as described and claimed in the copending application for Elastic Detection Streamer Dead Section for a Waterborne Seismic Detecting System, Ser. No. 464,739, filed June 17, 1965, now Patent No. 3,319,734, issued May 16, 1967. The dead section of the instant invention differs fom the dead section of the application supra only in the provision of an oil supply line extending throughout the length of the dead section and connected at the forward end thereof to oil tube 29 and at the trailing end to oil feed line 59 disposed within the detection streamer sections.

For the purpose of description, therefore, it will be assumed that the dead section is not required and the trailing end of the lead-in cable therefore is connected directly to the head end of the next succeeding detection streamer section.

The connections between the lead-in and the streamer section adjacent thereto, as well as the connections between adjacent streamer sections, comprise a multicontact plug and jack 61 for extending the electrical circuits therebetween, a mechanical coupler 62 for completing a towing connection to each of the strain cables 56, and a separable quick connective hydraulic coupler 63 having automatic shut-off valves in each half of the connectors. Thus, when an oil connection is broken as, for example, when a detection streamer section requires repair or replacement, fluid loss is minimal, and there is no air inclusion. A coupler suitable for the purpose is a valve known in the trade as a Hansen quick coupling valve with automatic locking action. This valve is so constructed that both the inlet and outlet ports thereof are immediately closed when the valve parts are separated and a through flow through the valve is effected when the parts are reassembled in the locking position, FIGS. 37–38.

On FIG. 7 is shown a detection streamer 10 such, for example, as the head end detection streamer connected to the lead-in 12 of FIG. 1 or to the trailing end of an elastic dead section streamer connected therebetween, as the case may be. The detection streamer of the present invention comprises several lengths of outer plastic sleeve members composed of material suitable for the purpose such as polyvinyl chloride connected in serial order as shown and filled with oil. For clarity in description, the several lengths of sleeve members comprising a single section of the detection streamer are designated by the numerals 64, 65, 66, and 67 in accordance with the sequential order of their appearance on the drawing. As more clearly shown in FIGS. 9–11 the leading or front end of the streamer section is provided with a plug or packing box generally indicated by the numeral 68 and of generally cylindrical configuration. The plug comprises a sleeve member composed preferably of aluminum and provided with a plurality of annular grooves 69 formed exteriorly therein for effecting an oiltight seal with the outer tubular member 64 of the streamer section when hose 58 is placed thereover and clamped by the clamps 71 which, like the other hose clamps described and illustrated herein on the lead-in and streamer sections, may be of any type suitable for the purpose such, for example, as a type known in the trade as a Punch-Lock clamp.

The sleeve member 70 is also provided with a pair of annular grooves 72 formed therein to receive and retain a pair of keeper rings 73 of the spring lock type respectively disposed therein. Abutting each keeper ring respectively are a pair of phenolic spacer elements 74–75 adapted to compress a phenolic seal 76 composed of a material such, for example, as neoprene sufficiently to force the seal into sealing engagement with the inner cylindrical surface of sleeve 70 and seal the signal conductors 54 and strain cables 56 together with hollow bolt member 77 within the packing box. Each of the spacer elements 74–75 is provided with suitable apertures through which the gnal conductors, bolt member, and metallic strain cables 6 extend.

A tubular bolt 77 of hollow configuration having the ead 78 thereof anchored to member 79 and preferably oweled to the spacer element 75 as shown on FIG. 11 is rovided to prevent rotation of the bolt as nut 81 is ghtened. A washer 82 is preferably assembled between ut 81 and the front spacer element 74. Tightening nut 81 ompresses neoprene seal 76 into fluid tight engagement ith the bolt in addition to effecting a sealing connection ith the strain cables 56 and conductors 54.

The bolt member 77 is provided with a pair of hollow ipples 83–84 coaxially disposed at opposite ends thereof 1 communication with the fore and aft portions of the olt respectively to each of which is connected a length f oil feed line 59 clamped securely thereto.

Referring now to FIG. 7 it will be noted that a number f spacers or float members 84 are disposed at intervals ithin the streamer sections similar to the spacers 84 withn the lead-in or tow cable. These spacers are composed f a plastic such as tyril plastic and are of generally cyindrical outer configuration snugly fitting within the treamer and tow cable and provided with a bore 85 within hich the signal conductors are arranged and a second ore encircling and supporting the plastic oil feed line 59. he floats are also provided with three uniformly spaced pertures 86 through which the strain cables 56 extend, IGS. 24–25. The float is composed of two complementary parts bonded together along a transverse center ine and provided with a cutaway portion 87 in communiation with each of the apertures 86 for the introduction f a lump of molten solder of sufficient size to bond to the train cables and prevent longitudinal movement of the loat with respect thereto. Each float is also provided with . plurality of sealed chambers 88 which may be oil filled r air filled, as the case may be, to impart a positive buoyncy thereto when the floats are immersed in oil. A suffiient number of floats are employed to render the streamer ubstantially neutrally buoyant when filled with oil and ubmerged within the water, the pressure of the oil withn the streamer being sufficient to dilate the streamer somevhat from its initial assembled condition. The term "neurally buoyant," as employed herein, may be defined as a ondition in which the weight of the fluid displaced by n object completely immersed therein is equal to the veight of the object.

The trailing end portion of tubular member 64 is oupled to the forward end of coupling member 89 composed of a plastic suitable for the purpose such, for exmple, as a plastic known in the trade as Lucite, FIGS. 7 nd 12, which has bores extending therethrough for the train cables 56, the signal conductors and the oil feed ine 59, FIG. 13. The coupling 89 is held in place on the train members by copper micropress sleeves 90 swaged n at least one of the strain cables, one on each side. here is also provided within the coupling member 89 n additional bore 91 within which is carried an oscillator 2 having a plurality of terminals 93 for establishing a lurality of external electrical connections thereto. A lepth transducer generally indicated by the numeral 94 nd referred to hereinafter as L6 is threadedly secured within a radial bore in the coupling member 89 and sealed herein as by the O-ring seal illustrated, FIG. 15. The ransducer comprises a laminated E-type core cemented o the interior of the casing of the transducer and having a thin flexible diaphragm 95 composed of steel and secured to the outer casing of the transducer in closely spaced adjacency to the core and in communication with the ambient water when the device is submerged therein, substantially as shown on FIG. 15, the diaphragm being secured to the casing in any suitable manner as by soldering the parts together at 96. A coil encircles the center leg of the core and is connected to a pair of terminals 97 having a pair of insulated wires connected thereto and passing through bore 98 for establishing an external electrical connection to the coil. The forward end of tubular member 65 is clamped to the trailing end of coupling 89.

Snugly fitted within tubular member 65 intermediate a pair of spacers 84 is a complementary two-piece transformer spacer mounting 99 having a transformer 101 secured therein when the spacer 99 is cemented together in the assembled position as shown on FIGS. 21–23.

A plurality of hydrophone spacers generally designated by the numeral 102, as best shown on FIGS. 16–18, are positioned at intervals throughout each streamer section, each spacer being composed of two complementary elements 103 and 104 each having bores running longitudinally therethrough for the strain cables, oil line feed and signal conductors respectively and an additional bore 105 of somewhat greater diameter contiguous therewith within which is disposed a pressure type hydrophone 106 having an O-ring 107 thereabout to maintain the hydrophone centrally disposed within the bore 105 when the complementary elements 103 and 104 are in the assembled condition. An aperture 108 is provided in each of the end walls of bore 105 to provide pressure communication between the oil within the streamer section and the exterior of the hydrophone 106. An external electrical connection is established to the hydrophone by conductors within apertures 109 of mounting element 103.

The hydrophone 106 is generally cylindrical in configuration with a pair of flat end portions and having an O-ring 107 composed preferably of neoprene cemented to the periphery thereof substantially as shown. A metallic casing having a pair of metallic end cover portions bonded thereto as by solder snugly encloses a hollow piezoelectric cylinder composed of barium titanate, or the like, and a pair of terminals 110–111 as illustrated are electrically connected to the metallic casing and the interior of the hydrophone respectively.

The trailing end of tubular member 65 is clamped in sealed engagement with the forward end portion of the oil inlet valve support 112, the aft end portion thereof being sealed to a length of tubing 66. The valve support 112 is provided with a pair of apertures extending therethrough within which are respectively disposed the signal conductors 54 and the oil feed line 59 in addition to three equally spaced apertures within which the strain cables 56 are respectively disposed. The oil feed line 59 is provided with a T-connector 113 for maintaining continuity of oil communication from the pressurized oil on the vessel to the next succeeding detection streamer section and with the inlet port of a normally closed solenoid actuated valve 120, hereinafter referred to as V1, disposed within an additional bore 114 formed within the valve support 112 and secured thereto as by the screws 115. A washer type seal 116 is preferably disposed between the valve casing and the bottom of bore 114 to effect an oil tight seal therebetween. A slot 117 extends between the bore for the oil feed line and bore 114 through which the interconnected T-member and inlet valve V1 are moved during assembly of these parts within the valve support 112.

Figure 33:
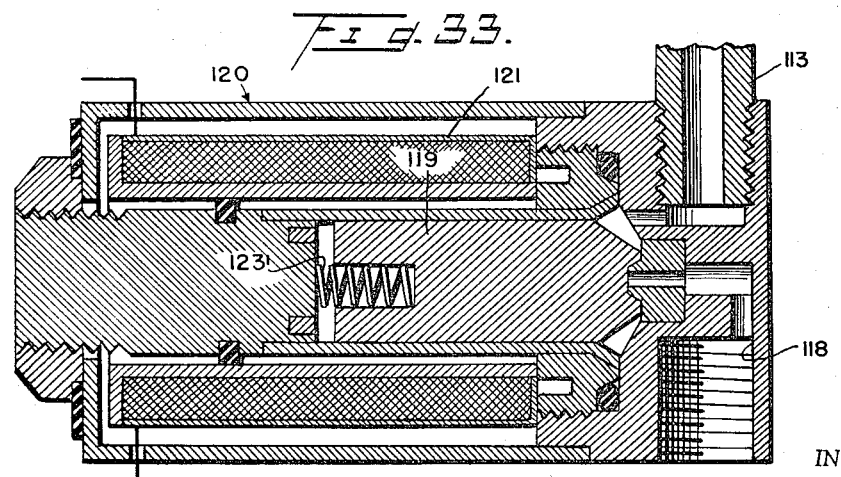
FIG. 33 is a greatly enlarged view in section of the normally closed valve of FIG. 29.

The outer casing of the inlet valve is generally cylindrical in configuration and somewhat less in diameter than the diameter of the bore 114 thereby to allow oil flowing outwardly from the exhaust port 118 thereof, when the valve is operated, to pass into and mix with the oil within the streamer section. A valve suitable for the purpose is a solenoid operated normally closed valve made as a commercial item and known in the trade as a Skinner valve, Series B, in which a plunger 119 is continuously urged against a seat by a spring $123^1$, FIG. 33, until withdrawn therefrom by energization of the solenoid coil 121. Each of the sections of the detection streamer is provided with a valve 120 mounted within a valve support member 112 and connected to the oil supply line 59 by a T-connector 113 with the exception of the last or trailing detection streamer section in which the T connector is replaced by an elbow member 122, FIG. 30.

The valve support member 112 is composed of a plastic suitable for the purpose such, for example, as Lucite, and supports within a couple of cavities formed therein a pair of Zener diodes D1 and D2, FIGS. 26–27, connected as shown to three terminal members threaded into an end portion of the valve support member.

The trailing end of the outer sleeve 66 is clamped to the leading end portion of exhaust valve support 123, the trailing end portion of the valve support being clamped to outer sleeve 67. In addition to the through apertures for the signal wires, oil supply line, and strain cables the exhaust valve support is recessed as best shown on FIG. 32 to receive and retain a normally closed solenoid operated exhaust valve 124, hereinafter referred to as V2. The valve, like valve 120, is bolted in position within a bore 125 of somewhat greater diameter than the outside diameter of the valve housing by a pair of bolts or screws 126 into firm engagement with the bottom wall of the bore, a washer type seal 129 being interposed therebetween to effect an oil tight connection as the screws 126 are tightened. The valve is substantially like the inlet valve 120 except that the inlet port thereof is in communication with the oil surrounding the outer cylindrical surface of the valve and thence to the oil with which the streamer section is filled and the outlet port has been modified in any suitable manner to exhaust through the base or end wall of the valve casing into a duct 127 extending to the exterior of the streamer section.

Figure 31:
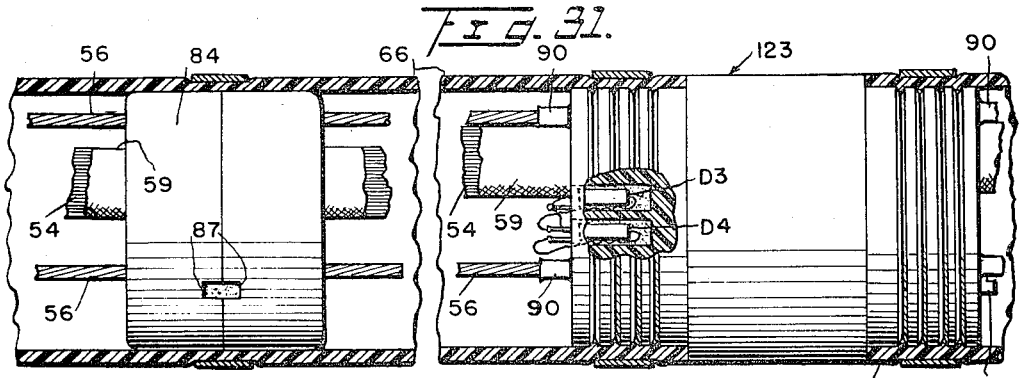
FIG. 31 is a view partially in section and partially broken away of the oil exhaust coupling member having certain electrical components supported thereby and a pair of adjacent lengths of outer sleeves of a streamer section clamped to opposite ends thereof.
Figure 32:
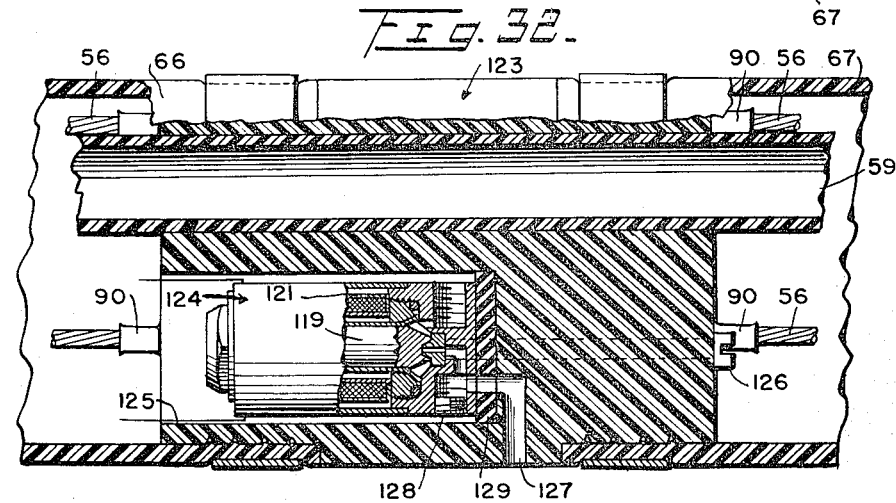
FIG. 32 is a sectional view partially broken away of the exhaust valve of FIG. 31 bolted in position within the oil exhaust coupling member and the outlet duct therefor.

This may be achieved as shown on FIG. 32, for example, by threading a plug 128 into the exhaust port, and forming a new exhaust port in the base of the valve in alignment with the duct 127 and providing an aperture in the seal 129 in alignment with the exhaust aperture and duct 127. The exhaust valve support is also provided with a pair of bores to receive and retain a pair of Zener diodes D3–D4 respectively, FIG. 31, connected to three terminals carried by the support substantially as shown.

The trailing end of outer flexible tubing 67 is clamped to a packing box or stopper 68, FIG. 9, when the short length of coupling hose 58 is slipped thereover and tightened thereto by the clamps illustrated, FIG. 7. When the next succeeding detection section has been secured to the trailing end of coupling hose 58 and the strain cables, oil line, and conductors therein have been connected, a thin oil tube having a flattened end portion is inserted beneath the short coupling hose 58 at an end portion thereof and the coupling hose is filled with oil, after which the oil tube is withdrawn and the clamps illustrated are tightened sufficiently to retain the oil therein.

On FIG. 8 is shown the last or trailing streamer section of the detection streamer. Like the other detection streamer sections it is provided with a depth transducer 89, transformer spacer 99 with transformer therein, oil inlet valve support 112 with inlet valve therein, oil exhaust valve support 123 with exhaust valve 124 therein, three strain cables 56 running interiorly throughout the length thereof, a plurality of pressure type hydrophone elements 102 spaced at intervals throughout the length of the detection streamer section and a plurality of float spacer elements 84 sufficient to provide substantial neutral buoyancy to the section when immersed within the water.

In addition to the foregoing the detection streamer of FIG. 8 is provided with a plug member 131 comprising an interiorly projecting member 132 having three equally spaced faces 133 to which the ends of the strain cables 56 are secured as by the screws 134. The member 132 is secured to the plug member 131 by screws (not shown). The plug member 31 is also provided with an eye bolt 135 swiveled thereto to which a marker buoy may be secured, if desired, to provide a visual indication of the position of the trailing end of the streamer within the water.

Referring now to FIGS. 37 and 38, the quick connective hydraulic coupler 63 is shown in a coupled and uncoupled position, respectively. The coupler comprises a spring pressed actuating member 136 manually moveable to the left as viewed on the drawing, when a connecting or disconnecting operation is desired the member 136 moving to the initial position shown on the drawing by a spring, not shown, when the actuating force is removed therefrom. A plurality of locking balls are arranged within the member 136 in a manner to engage a complementary circular locking member 137 when the parts are in the locking position as shown on FIG. 37. The male and female portions or sections of the coupler each comprises a normally closed valve (not shown) spring actuated to the closed position when the parts are uncoupled as shown in FIG. 38 whereby the fluid feed line or tubular members 59 respectively clamped to each of the male and female valve portions are sealed. When the valve is moved to a coupled position, FIG. 37, a moveable protrusive member or lobe 138 engages a moveable complementary protrusive member within the female coupling section (not shown) and moves both normally closed valve members to open position thereby establishing fluid communication through the connector 63 to the lengths of tubular members 59. When employed for establishing a quick connective coupling between adjacent streamer sections of the detection streamer it has been found desirable to clamp the male coupler on the oil line hose 59 protruding from the head end of the streamer section and the female coupler on the end of the oil line hose 59 protruding from the tail end of the streamer section. Since these quick detachable couplings are of a type known in the trade as a Breco Pushomatic Quick Coupling, a further detailed description thereof is deemed to be unnecessary herein.

The operation of the system for controlling specific gravity of the different interconnected sections of a flexible expansible oil filled detection streamer to equality with the specific gravity of the water at the depth at which the sections are disposed within the water sufficiently to maintain the streamer at a predetermined depth of submersion throughout the length thereof will best be understood by reference to the schematic diagram of FIG. 39 on which is shown in simplified form both the apparatus on the towing vessel and the means within the streamer for achieving this result. The control apparatus on the vessel comprises a two-pole three position switch S1 having the switch blades thereof connected to a pair of conductors 139 and 141 extending to the streamer section. With the switch in position 1 thereof a positive potential from source E1 is applied to conductor 139 and a negative potential is applied to conductor 141. With the switch in position 3 the potentials of the conductors 139 and 141 are reversed by reason of their connection to potential source E2. In either of these positions the seismograph recording element is disconnected from the streamer.

When switch S1 is set to position 2 the battery sources E1–E2 are both disconnected from the conductors 139–141 and the recording element corresponding to the streamer section is connected to the conductors 139 and 141 in readiness to receive a seismic signal from the hydrophones P disposed interiorly at intervals throughout the streamer section associated with switch S1.

When an operator on the vessel desires to increase the buoyancy of the detector streamer section, he moves switch S1 to position 1 thereby applying a positive potential to normally closed solenoid operated valve V1 by way of diode D1 and Zener diode D2 from whence the circuit is continued by conductor 141 which now has a negative potential applied thereto. The voltage of each of the sources E1 and E2 is greater than the breakdown voltage of diodes D1 and D3 respectively and normally closed solenoid valve V1 operates causing an additional quantity of oil from the oil supply source to flow into the detection streamer and expand the outer sleeve of the streamer comprising the interconnecting lengths 64–65–66 and 67 sufficiently to increase the buoyancy thereof. Solenoid operated valve V2 is prevented from operation at this time by reason of the provision of diode D3 which, as indicated, prevents a flow of current therethrough until the polarity of the potential applied to conductors 139–141 has been reversed. When switch S1 is moved away from position 1, the solenoid of valve V1 is deenergized and valve V1 closes.

When switch S1 is moved to position 3, negative potential is applied to conductor 139 and positive potential to conductor 141 thereby operating normally closed solenoid valve V2 and allowing some of the oil within the streamer section to escape to the surrounding water until switch S1 is moved out of position 3. Valve V1 is prevented from operation while V2 is operated by reason of the blocking action of diode D1 connected thereto. From the foregoing it is submitted to be clear that oil is admitted to or exhausted from the streamer section selectively in accordance with the setting of switch S1 in positions 1 or 3 thereof.

The initial pressure of the oil within the streamer, it should be noted, is sufficient to cause outward flow therefrom in response to the operation of valve V2 and to expand the streamer section somewhat prior to launching the section within the water. Furthermore the pressure of the oil within the line 59 should be sufficient to force additional oil into the streamer section in response to the operation of valve V1 regardless of the depth of submersion of the streamer within the water.

Capacitor C1 isolates the output winding of transformer T1 from the DC depth control voltages, and resistance R1 is employed to smooth out somewhat the signals applied by the hydrophones to the input winding of transformer T1.

When a seismic signal is to be recorded on the seismograph, switch S1 is moved to position 2. Valves V1 and V2 are prevented from being operated or otherwise interfering with the seismic signals received over conductors 139–141 by reason of the Zener diodes D2 and D4 respectively connected thereto for the reason that the voltage of the seismic signals is less than the operating voltage of the Zener diodes. Seismic signal isolation is thus provided.

On FIGS. 40 and 41 is shown a preferred embodiment of the invention in which the intervention of an operator to control the buoyancy of the different streamer sections is not required, FIG. 40 illustrating the buoyancy control and seismic signal recording apparatus on the towing vessel and FIG. 41 illustrating the complementary buoyancy control and seismic detecting apparatus of a single detection streamer section employed therewith. Referring now to FIG. 40 for a more complete understanding of the preferred embodiment of the invention, there is shown thereon a pair of differential control amplifiers A1 and A2. Amplifier A1 is composed of transistors Q1 and Q2 together with relay RL1 and the associated resistors. In like manner amplifier A2 is comprised of transistors Q3 and Q4 together with relay RL2 and the associated resistors. The operation of relay RL1 connects positive potential from source E1 to conductor 142 and negative potential to conductor 143. Conversely, the operation of relay RL2 connects negative potential from source E2 to conductor 142 and positive potential to conductor 143.

The selective operation of relays RL1 and RL2, it will be noted, causes a potential of predetermined polarity to be applied to the pair of seismic channel conductors 142–143 leading to the associated streamer section thereby to cause selective operation of solenoid valves V1 or V2, as the case may be, and thus vary the buoyancy of the streamer section. These relays thus perform the control function of varying the buoyancy of the streamer performed in FIG. 39 by the switch S1 shown thereon without the intervention of an operator.

Relays RL1, RL2, and transistors Q1–Q4 are operated on a circuit including normally closed contacts of relay RL3, switch SW and thence to a source of potential E3. Relay RL3 is operated in any suitable manner as by switch GS employed for lighting the galvanometer lamp of the seismograph thereby preventing the application of DC control voltage (E1 or E2) during the recording of seismic data which would otherwise shunt the signal to cause noise on the seismograph.

A 2.5 kc. oscillator is connected to the seismic channel through capacitors C5 and C6. These two capacitors offer a low resistance to the 2.5 kc. signal, but a high reactance to frequencies of the seismic signals. A pair of capacitor elements C3 and C4 are disposed between conductors 142 and 143 respectively and the recording element to isolate the channel recording element of the seismograph from the DC control supplies E1 and E2.

The apparatus on the vessel also comprises a regulated DC power supply connected to the base of transistor Q2 and having a pair of variable resistance units DR and SGR adjustable to compensate for the depth of the streamer and the specific gravity of the body of water within which the detection streamer is towed respectively. As is well known, the specific gravity of the various bodies of water throughout the world may vary as much as three percent. The output voltage of the DC power supply depends on the setting of the depth control resistor DR, as shown, and on the setting of the specific gravity control resistor SGR.

Now if the streamer goes too deep, the voltage from the meter M, FIG. 42 (applied to the base of transistor Q1 by way of conductor 149), exceeds the reference voltage applied to the base of transistor Q2 by a predetermined amount, Q1 conducts turning off Q2 and closing relay RL1. The manner in which this voltage on meter M is obtained will be more clearly apparent as the description proceeds.

It will be recalled that the operation of relay RL1, as hereinbefore stated, causes a control potential E1 to be applied to conductors 142–143. This causes the streamer to take on additional oil from the oil supply line and the buoyancy of the streamer therefore increases. When the streamer has risen to the predetermined depth, Q1 shuts off, relay RL1 opens and valve V1 closes.

The operation of differential amplifier A2 is similar to amplifier A1. When the streamer is towing at the proper depth, Q4 is conducting thus holding off Q3. If the streamer rises above a predetermined depth, Q3 turns on thus closing relay RL2 thereby causing a control potential E2 to be applied to conductors 142–143 such that conductor 142 is negative and conductor 143 is positive. Valve V2 now opens causing oil to be released from the streamer and the buoyancy thereof to decrease. When the streamer has settled to the predetermined depth, Q3 turns off and valve V2 is reclosed.

Referring now to FIG. 41 there is shown thereon a seismic channel comprising a pair of conductors 142–143 over which the 2.5 kc. and DC control voltages enter the streamer and over which the seismic signals sensed by the hydrophones P are transmitted from the streamer to the vessel. Inductance L2 and capacitor C13 are series resonant at 2.5 kc., and connected across conductors 142–143 thereby shorting out the 2.5 kc. signal and preventing its entry into the hydrophone P. The 2.5 kc. signal across L2 is extracted by conductors 145 and 146 connected thereto. This signal is rectified by rectifying elements D5 and D6 and causing capacitors C10 and C9 to charge up and supply a DC voltage through resistor R1 to Zener regulator D7. Filtering is provided by capacitor C11.

Transistors Q11 and Q12, together with the associated circuitry, form a feedback oscillator. Transistor Q13 is a source-follower which provides isolation of the load from the oscillator. The resonant frequency is determined by the depth transducer L6 which is a diaphragm-driven variable inductor with the diaphragm in communication with the surrounding water and having a capacitor C16 connected in parallel therewith. At the surface of the water, the circuit oscillates at a frequency of 1 kc. while at a depth of submergence of 100 feet within the water, the frequency of oscillation is 900 cycles.

Transistors Q11, Q12, and Q13 together with C16 and all the other immediate resistors and capacitors L3, C12, L4, C14, L5, C15, T2, L2, C13, L1, C8, C11, D7, R1, D5, D6, C10 and C9 will be encapsulated in a separate housing and mounted in the end of a spacer generally similar to the spacer of FIG. 12. All the parts are interconnected and then encapsulated in molded epoxy resin. Terminals are provided on one end and correspond respectively to the letters A, B, C, D, E, and F on the circuit diagram of FIG. 41 for establishing external connections thereto.

The output of transducer 94 is coupled back into the streamer through transformer T2 and the band pass filter composed of L3, C12, C14, L4, C15 and L5. The band pass filter passes the transducer output frequencies with little attenuation, but blocks the 2.5 kc. and DC signals from the transducer output, and filters out any low frequency noise generated by Q11, Q12 and Q13. Such noise would be objectionable if allowed to reach the seismograph. Capacitor C8 and inductor L1 form a series resonant circuit at 950 cycles, thereby allowing the output of T2 to appear at the conductors 142 and 143.

Referring now to FIG. 40 the conductors 142 and 143 are connected by conductors 147 and 148 respectively to a depth indicating meter demodulator circuit which will now be described with particular reference to FIG. 42. The 1 kc. signal enters transformer T3 and is amplified by transistors Q21 and Q22. Since the combined gains of Q21 and Q22 are high, the sine wave input is changed to a square wave as shown on the drawing. This square wave is differentiated by C1 and R1 forming a positive spike at the base of transistor 23 as illustrated. Transistors Q23 and Q24 form a single-shot multivibrator. In the quiescent condition, Q24 is on and Q23 is off. R2 holds Q24 on and the feedback through R3 holds Q23 off. When a signal is applied at the input transformer T3, a spike appears at the base of Q23 turning Q23 on and Q24 off. Thus the output voltage rises at the collector of Q24 which is not conducting at this time. Transistor Q24 remains off (nonconducting) for a time $t_1$ which is set by the timing capacitor C2 together with resistor R2. At the end of this time, transistor Q24 again conducts until another spike is received. The interval between is $t_2$ and is determined by the frequency of the incoming signal. Thus the output of Q24 is a square wave having a constant width and a repetition rate determined by the instant position of the diaphragm of the depth transducer 94.

Thus, the average collector potential of Q24 is a function of the frequency of the incoming signal which is a function of depth of the streamer section. The meter M is connected to measure and give a visual indication of the Q24 average collector voltage and thus indicate the depth of the transducer 94 within the streamer section. The meter output is also connected to the differential amplifiers A1 and A2 by conductor 149 to apply a control voltage thereto correlative with the instant depth of submersion of the detection streamer section. The amplifiers A1 and A2 operate selectively in accordance with the direction and degree of vertical deviation of the streamer section from a predetermined depth of submersion within the water causing the operation of relays RL1 and RL2 respectively controlled thereby. When this occurs a potential from source E1 or E2 is applied to conductors 142–143 comprising the seismic channel to the streamer and thereby causing the operation of solenoid valve V1 or V2 to open and permit additional oil from the oil supply line to flow into the streamer or to exhaust a portion of the oil into the surrounding water, as the case may be.

The meter M may be of any type suitable for the purpose such, for example, as the meter M illustrated on FIGS. 35 and 36 configured to provide an "edgewise" read-out panel 151 of arcuate configuration traversed by a pointer 152 and provided with a plurality of indicia corresponding to the different depths of submersion of the streamer within the water.

In FIG. 34 is shown a bank of 24 such meters respectively corresponding to 24 interconnected sections of a detection streamer, the associated streamer sections being indicated by the row of numerals 1–24 extending in a horizontal line across the meter bank. This meter arrangement provides instant visual indication of the depth of each of the streamer sections while the streamer is being towed through the water and if the predetermined depth, for example, was 30 feet, the departure of each streamer section therefrom is made clearly manifest.

In the streamer described and illustrated herein, the outer "skin" of each of the streamer sections is initially somewhat smaller than the diameter of the spacers and a quantity of oil is initially forced into the streamer under pressure to expand the "skin" sufficiently to impart a neutral buoyancy thereto when immersed in the water. This insures an exhaust action of the oil at different depths of submersion by contraction of the "skin" when valve V2 is opened.

Although it will be noted that the invention has been described with reference to normally closed solenoid operated valves for controlling the quantity of oil within the streamer sections, it is not so limited as small motor driven valves, if desired, may be used in lieu thereof, and small motor driven oil pumps may be employed within the streamer sections to additionally force a flow of oil into the sections and to exhaust a portion of the oil therefrom as required to maintain the streamer sections at a predetermined depth of submersion, particularly if the pressure of the oil within the streamer sections were susbtantially increased. Furthermore, if desired, a return oil line could be included within the streamer whereby the oil would be returned to the vessel during an exhaust operation to effect a decrease in the buoyancy of the streamer sections in lieu of discharging the surplus oil into the surrounding water.

Whereas the invention has been described with reference to two examples which give satisfactory results it is not so limited as it will be apparent to those skilled in the art, after understanding the invention, that various changes and modifications may be made without departing from the spirit and scope of the invention, and it is my intention, therefore, in the appended claims to cover all such changes and modifications.

What I claim as new and desire to be secured by Letters Patent of the United States is:

1. In a waterborne system towed by a continuously moving vessel for seismic prospecting for geological structures disposed beneath a body of water, in combination,
   (a) a substantially neutrally buoyant elongated flexible oil filled expansible streamer having a plurality of pressure responsive seismic detecting devices therein connected to the vessel by a pair of conductors forming a channel,
   (b) a flexible lead-in cable connected to the head end of said streamer for effecting a towing connection therefrom to the vessel,
   (c) a source of pressurized oil on the vessel,
   (d) an oil line extending from said oil source through said lead-in cable to the interior of said streamer,
   (e) an electrically operated normally closed valve in said streamer connected to said oil line and having the outlet thereof in communication with the interior of the streamer,
   (f) signal discriminating means interconnecting the valve with said channel in a manner to cause said valve to operate and open in response to a control signal applied to said channel,
   (g) and means on the vessel for applying a control signal to said channel thereby to operate said valve and cause an additional quantity of oil to flow into the streamer sufficient to expand the streamer and increase the buoyancy thereof.

2. A system according to claim 1 including,
(a) a second electrically operated normally closed valve in said streamer having the inlet thereof in communication with the oil within the streamer and the outlet connected to a duct sealed externally to the streamer and communicating with the ambient water within which the streamer is submerged,
(b) a second signal discriminating means interconnecting said second valve with the channel in a manner to cause said second valve to operate and open in response to a second control signal applied to said channel,
(c) and means on the vessel for applying a second control signal to said channel thereby to operate said second valve and cause a quantity of oil within the streamer to flow outwardly therefrom into the surrounding water sufficient to cause the streamer to contact and decrease the buoyancy thereof.

3. A system according to claim 2 including,
(a) a seismic recording device normally connected to said seismic channel and operable by said seismic detecting devices when said first and second control signals are not applied to the channel,
(b) and means on said vessel for disconnecting the seismic recording device from the channel when either of said control signals is applied thereto.

4. A system according to claim 2 in which the discriminating means interconnecting said normally closed valves with said channel each includes,
(a) a Zener diode having a breakdown voltage in excess of the signals applied to said channel by said pressure responsive detecting devices in response to a seismic signal received thereby whereby the valves are disconnected from said channel when the seismic signals are received.

5. A system for controlling the buoyancy of an expansible oil filled detection streamer for seismic exploration of geological structures disposed beneath a body of water while the streamer is towed beneath the surface of the water by a moving vessel, comprising in combination,
(a) a moving vessel having a plurality of seismic recording devices thereon,
(b) a flexible detection streamer comprising a plurality of oil filled expansible streamer sections connected together in serial order, each section having a plurality of seismic wave detecting devices therein,
(c) a plurality of channels each comprising a different pair of signal conductors, each of said channels being connected respectively to the seismic detecting devices of a streamer section and to a recording device on the vessel and individual thereto;
(d) a source of oil under pressure on the vessel;
(e) an oil supply line extending throughout the streamer sections from said oil source and having a plurality of ducts extending therefrom into each of the sections respectively,
(f) a plurality of electrically operated normally closed inlet valves connected respectively to said ducts and having the outlet thereof in fluid communication with the interior of the streamer section in such manner that an additional quantity of oil flows therethrough into the section when the valve is operated,
(g) a like plurality of electrically operated normally closed exhaust valves disposed respectively within said sections and having the inlet thereof in fluid communication with the oil within the section and the outlet thereof communicating with the exterior of the section in such manner that a quantity of oil is exhausted from the section when the exhaust valve is operated,
(h) means including a pair of Zener diodes and rectifying devices respectively connected to the conductors of each of said channels in such manner as to establish a control connection to operate said inlet and exhaust valves selectively in accordance with the strength and polarity of a control signal applied thereto;
(i) a source of high frequency voltage on the vessel connected to the pairs of conductors forming said channels and prevented from reaching the seismic detecting devices by an inductance-capacitor trap disposed within each of the sections and connected to the pair of conductors individual thereto,
(j) a feedback oscillator including a source-follower disposed within each of said sections and connected to isolate the load from the oscillator,
(k) means within the section for rectifying the high frequency voltage from the pair of conductors forming said channel and applying the rectified D.C. voltage to said oscillator,
(l) a depth transducer within the streamer and connected to said oscillator, said transducer comprising a variable inductor operable by a diaphragm in communication with the surrounding water and a capacitor in parallel therewith in such manner that the frequency of the oscillator is about 1.0 kc. at the surface of the water and decreases to 900 cycles at a depth of submergence of 100 feet,
(m) means including a transformer connected to the channel for coupling the output of the depth transducer controlled oscillator thereto,
(n) a depth indicating meter demodulator circuit on the vessel connected to said channel having means for providing a D.C. voltage correlative with the frequency of the incoming signal from said oscillator,
(o) a pair of differential amplifiers having a predetermined reference voltage applied thereto and connected to the meter output, said amplifiers being operable selectively in accordance with the voltage differential between said reference voltage and the signal voltage from the meter demodulator corresponding to the direction and degree of vertical deviation of the transducer from a predetermined depth thereof,
(p) a pair of relays connected respectively to said differential amplifiers and operable thereby, each of said relays being connected respectively to said channel conductors in a manner to apply a predetermined D.C. voltage signal thereto of sufficient strength to operate one of the Zener diodes and the valve controlled thereby selectively in accordance with the strength and polarity of said voltage signal thereby to admit oil into the streamer section or to exhaust oil therefrom selectively in accordance with the instant setting of the depth transducer.

6. A buoyancy control system according to claim 5 including,
(a) a band pass filter comprising a series resonant circuit of 950 cycles connected to the output of said depth transducer in a manner to isolate the high frequency voltage and D.C. control signals therefrom.

7. A buoyancy control system according to claim 5 including,
(a) means on the vessel and operable at will for disabling said pair of differential amplifiers thereby to prevent a buoyancy control signal from being applied to said channels while a seismic signal is received from said seismic wave detecting devices.

8. A waterborne system for seismic prospecting comprising,
(a) an expansible oil filled substantially neutrally buoyant seismic detection streamer having a plurality of seismic detecting devices therein towed submerged within the water by a vessel,
(b) a channel of communication comprising two conductors normally connecting the detecting devices with a seismograph element on the vessel, (c) means including a normally closed inlet valve and a normally closed exhaust valve disposed within the streamer for admitting an additional quantity of oil to the streamer and for discharging oil from the streamer respectively as the valves are selectively operated, (d) a source of oil under pressure on the vessel in fluid communication with said inlet valve for increasing the quantity of oil within the streamer thereby to dilate the streamer and increase the buoyancy thereof as the inlet valve is opened, (e) means within the streamer including a pair of Zener diodes interconnecting the valves with said channel in such manner that the valves are operated selectively in accordance with the strength and polarity of a control signal applied to the channel, (f) a feedback oscillator in said streamer, (g) oscillator means on the vessel for applying a high frequency voltage to said channel, (h) means within the streamer for rectifying said voltage and applying the rectified voltage to said oscillator, (i) means including a depth transducer within the streamer and having a movable element thereof in communication with the water when the streamer is immersed therein for varying the frequency of oscillation of the oscillator in accordance with the degree of movement of the movable member from an initial position of rest correlative with the depth of submersion thereof, (j) means including a band pass filter coupling the output of the oscillator to said channel, (k) means on the vessel including a meter modulator for indicating the depth of submergence of said depth transducer connected to said channel and providing a D.C. voltage to a voltage input terminal of the meter correlative with the frequency of the signal received from the oscillator and controlled by said depth transducer, (l) a reference source of regulated voltage on the vessel, (m) a pair of differential amplifiers on the vessel connected to said regulated voltage source and to the voltage input terminal of the meter, (n) a pair of relays connected to said amplifiers respectively and arranged to apply a control signal to said channel of strength and polarity to operate said inlet and exhaust valves selectively in accordance with the operated condition of said amplifiers, and (o) means including a pair of interconnected transistor elements on each of said amplifiers for operating one of said amplifiers and preventing operation of the other amplifier in accordance with the relative values of voltage from said controlled voltage source and the voltage received from the meter modulator means at the meter terminal thereof.

9. A waterborne system according to claim 8 in which the oscillator means on the vessel for applying a high frequency voltage to said channel includes, (a) a pair of capacitor elements in the electrical connections from the high frequency oscillator to the two conductors forming the channel and (b) a series circuit resonant at said high frequency voltage connected across said channel conductors within said streamer to prevent the high frequency signal from reaching the seismic detecting devices disposed therein.

10. A waterborne system according to claim 9 which includes, (a) a source-follower connected between the feedback oscillator and the load to provide electrical isolation therebetween.

11. In a waterborne system continuously towed by a moving vessel for making a seismic survey of geological structure beneath a body of water, in combination, (a) a substantially neutrally buoyant elongated flexible and expansible streamer comprising, (b) a plurality of serially connected oil filled sections, each of said sections having a plurality of seismic detecting devices therein, (c) a plurality of two conductor channels each interconnecting the detecting devices of each section with a seismic recorder element individual thereto on the vessel, (d) a pressure controlled depth sensing device within each of the sections, (e) means on the vessel and connected to said depth sensing device for indicating the depth of submersion of the section associated therewith, (f) means within each section and actuated by a D.C. control signal on said channel for admitting additional oil within the section and for exhausting oil therefrom selectively in accordance with the polarity of the control signal, (g) a source of oil on the vessel, (h) means interconnecting the oil from said source with each section, (i) and means on the vessel for applying said control signal to a selected channel to vary the quantity of oil within the section and thereby change the buoyancy thereof sufficiently to bring the section to a predetermined depth of submersion.

12. In a waterborne system according to claim 11, the combination of (a) a feedback oscillator disposed within each section and connected to said depth sensing device in such manner as to decrease the frequency of oscillations of the oscillator as the depth of the water sensed by the depth sensing device increases, (b) means including a transformer for applying the oscillations of the oscillator to the channel associated therewith, (c) a meter demodulator on the vessel and connected to the channel having a D.C. meter connected thereto and operable by the demodulated oscillations for indicating the depth of submersion of said depth sensing device.

13. A waterborne system according to claim 12 in which the means on the vessel for applying the D.C. control signal to said channel comprises, (a) a source of reference voltage on the vessel, (b) a pair of differential amplifiers on the vessel connected to said source of reference voltage and to said D.C. meter in such manner that the amplifiers are operated selectively in accordance with the polarity of the voltage differential therebetween, (c) means including a relay connected to one of said amplifiers and operable thereby for applying a control signal of predetermined polarity to the conductors of the channel associated therewith, and (d) means including a second relay connected to the other of said amplifiers and operable thereby for applying a control signal of reversed polarity to the conductors of said last named channel and, (e) means within the streamer responsive to the polarity of said control signal for selectively increasing and decreasing the quantity of oil within the streamer respectively.

14. The combination of claim 13 including (a) means including a third relay for preventing the operation of said first named relay and second relay as the third relay operates, and (b) means operable at will for operating said third relay.

15. The combination of claim 13 which includes (a) a source of high frequency voltage on the vessel capacitatively connected to each of said plurality of two conductor channels, (b) means in each of said sections and connected to the channel associated therewith for rectifying said high frequency voltage, and (c) means connecting said rectifying means to said feedback oscillator for applying the rectified voltage thereto.

16. The combination of claim 15 including
(a) a plurality of series inductance-capacity circuits resonant at said high frequency and connected across the channel conductors within each of the streamer sections respectively for preventing the high frequency signal from entering the seismic detecting devices disposed within the streamer sections.

17. The combination of claim 16 including
(a) an inductance-capacity trap tuned to the frequency of said high frequency voltage disposed in series with one conductor of each of said channels intermediate the point of application of the high frequency voltage thereto and the seismic recorder element associated therewith.

18. The combination of claim 17 including,
(a) an inductance-capacity trap tuned to substantially the mean frequency of said feedback oscillator and disposed in series with said one conductor of each of said channels intermediate the high frequency trap and said seismic recorder.

19. The combination of claim 18 including
(a) a pair of capacitor elements respectively included in series with the pair of conductors connected to said seismic recorder element for providing isolation of the recorder element from the control voltages applied to the channel.

20. A system for controlling the buoyancy of an elongated expansible flexible oil filled detector streamer comprising a plurality of serially connected streamer sections, each having a plurality of hydrophones therein and towed continuously at a predetermined depth of submersion through the water by a vessel, which comprises,
(a) a plurality of two conductor channels, each channel being connected to the hydrophones within each different streamer section respectively and to a seismic recorder on the vessel,
(b) an integral depth indicator on the vessel and connected to said channels,
(c) means within each streamer section including a transducer having a movable element in communication with the surrounding water and settable to different settings correlative with the instant depth of submersion of the transducer within the water,
(d) means controlled by the instant setting of said movable element for actuating said depth indicator to a setting correlative with the instant depth of submersion of the streamer section and providing a voltage corresponding thereto,
(e) means for comparing said voltage with a reference voltage source on the vessel corresponding to the predetermined depth of submersion of the streamer within the water,
(f) means connected to said voltage comparing means for applying a buoyancy control signal to the streamer section over said channel,
(g) an oil feed line from a pressurized source of oil on the vessel to each of said streamer sections,
(h) and means including an inlet valve within the streamer section and controlled by the buoyancy control signal for causing an additional quantity of oil from said feed line to flow inwardly into and expand the streamer section and an exhaust valve to exhaust a portion of the oil therefrom sufficient to cause the streamer section to contract, said inlet and exhaust valves being operated selectively in accordance with the polarity characteristic of said buoyancy signal until the streamer section has reached said predetermined depth of submersion while the streamer is towed by the vessel.

21. A system according to claim 20 in which the voltage comparing means comprises,
(a) a first differential amplifier connected to receive said indicator actuating voltage and said reference voltage and having a relay connected thereto and effective to apply a voltage control signal of predetermined polarity to said channel when the indicator actuating voltage exceeds the reference voltage by a predetermined amount,
(b) a second differential amplifier connected to receive the indicator actuating voltage and the reference voltage and having a second relay connected thereto effective to apply a second voltage control signal to said channel of reverse polarity to said first named voltage control signal when the reference voltage exceeds the indicator actuating voltage by a like predetermined amount, and
(c) means including a pair of Zener diodes within the streamer section and opposedly connected to said channel for applying said buoyancy control signals to said inward oil flow and oil exhaust means selectively in accordance with the polarity of said control signal.

22. A buoyancy control system according to claim 20 in which the integral depth indicator comprises,
(a) a plurality of like indicator elements respectively connected to a like plurality of channels, each element having a pointer movable to different settings respectively corresponding to different depths of submersion,
(b) a plurality of arcuately curved dial plates having indicia thereon corresponding to different depths of submersion and traversed by said pointer, and
(c) means supporting said dial plates in side-by-side relation such that all pointers will be in a substantially straight line when the same depth of submersion is indicated by each of said indicator elements.

References Cited
UNITED STATES PATENTS

| | | | |
|---|---|---|---|
| 2,359,366 | 10/1944 | Katcher et al. | 114—235 |
| 2,371,404 | 3/1945 | Mumford | 114—235 |
| 2,465,696 | 3/1949 | Paslay | 181—.5 |
| 2,632,150 | 3/1953 | Silverman et al. | 181—.5 |
| 2,735,303 | 2/1956 | Haase | 340—7 X |
| 2,791,757 | 5/1957 | Blake et al. | 340—7 |
| 3,301,209 | 1/1967 | Caldwell | 114—16 |
| 3,308,425 | 3/1967 | McLoad | 340—7 X |

BENJAMIN A. BORCHELT, *Primary Examiner.*

W. KUJAWA, *Assistant Examiner.*